United States Patent
Toji

(10) Patent No.: US 7,231,143 B2
(45) Date of Patent: *Jun. 12, 2007

(54) MANUAL FOCUS DEVICE AND AUTOFOCUS CAMERA

(75) Inventor: Shigeo Toji, Saitama (JP)

(73) Assignee: Fujifilm Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/481,814

(22) Filed: Jul. 7, 2006

(65) Prior Publication Data

US 2006/0251413 A1 Nov. 9, 2006

Related U.S. Application Data

(62) Division of application No. 10/614,328, filed on Jul. 8, 2003, now Pat. No. 7,099,575.

(30) Foreign Application Priority Data

| Jul. 8, 2002 | (JP) | ............................ 2002-198963 |
| Jul. 8, 2002 | (JP) | ............................ 2002-198967 |
| Sep. 25, 2002 | (JP) | ............................ 2002-279553 |

(51) Int. Cl.
 *G03B 13/36* (2006.01)
(52) U.S. Cl. ........................ 396/111; 348/345
(58) Field of Classification Search ................ 396/111, 396/114, 95; 348/345
 See application file for complete search history.

(56) References Cited

U.S. PATENT DOCUMENTS 3,977,012 A 8/1976 Erlichman

| 4,149,794 A | 4/1979 | Takahama et al. |
| 4,599,653 A | 7/1986 | Kimura et al. |
| 6,453,124 B2 | 9/2002 | Moriomoto et al. |
| 6,473,126 B1* | 10/2002 | Higashihara et al. ....... 348/345 |
| 6,700,615 B1 | 3/2004 | Satoh |
| 7,099,575 B2* | 8/2006 | Toji ............................ 396/111 |

FOREIGN PATENT DOCUMENTS

| JP | 09-214813 A | 8/1997 |
| JP | 2001-281530 A | 10/2001 |
| JP | 2001-309210 A | 11/2001 |

\* cited by examiner

*Primary Examiner*—W. B. Perkey
(74) *Attorney, Agent, or Firm*—Sughrue Mion, PLLC

(57) ABSTRACT

A digital still camera includes an aperture stop opening, a taking lens system, and a CCD pickup element. In a manual focus device, an iris shifting mechanism sets the aperture stop opening in an aperture stop unit with reference to a first light amount gravity center by shifting the aperture stop opening to the right relative to a lens optical axis, and sets the aperture stop opening with reference to a second light amount gravity center by shifting the aperture stop opening to the left. First and second sample pickup data are obtained by the CCD pickup element in the setting of the aperture stop opening at the two light amount gravity centers. A display panel displays first and second sample images according to the sample pickup data, to indicate a present deviation of the taking lens system from an in-focus position in simulation. A focusing ring is externally operable, for moving the taking lens system on the optical axis, and for actuation while the two sample images are checked visually, to position the taking lens system when the two sample images inform a reach to the in-focus position.

2 Claims, 16 Drawing Sheets

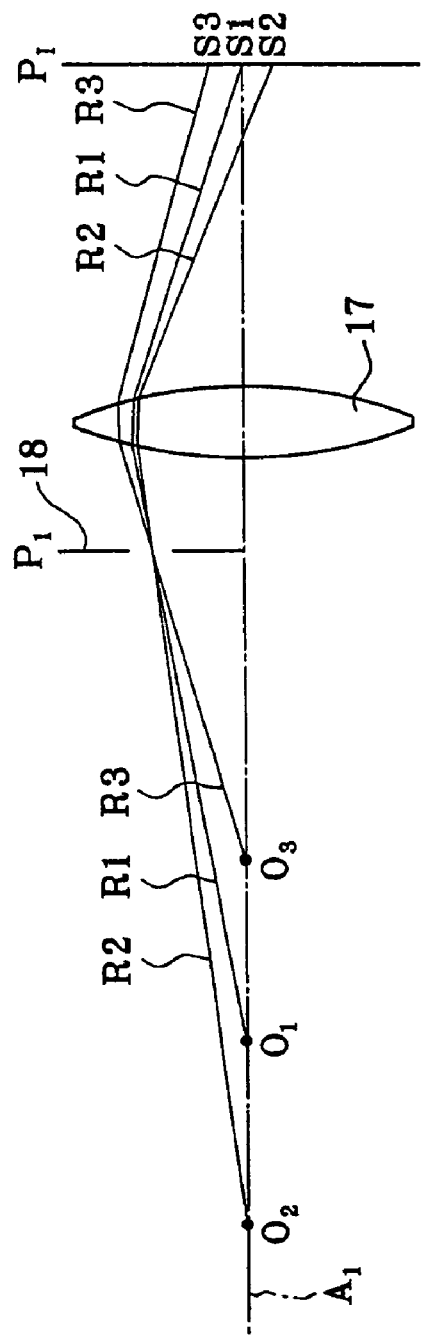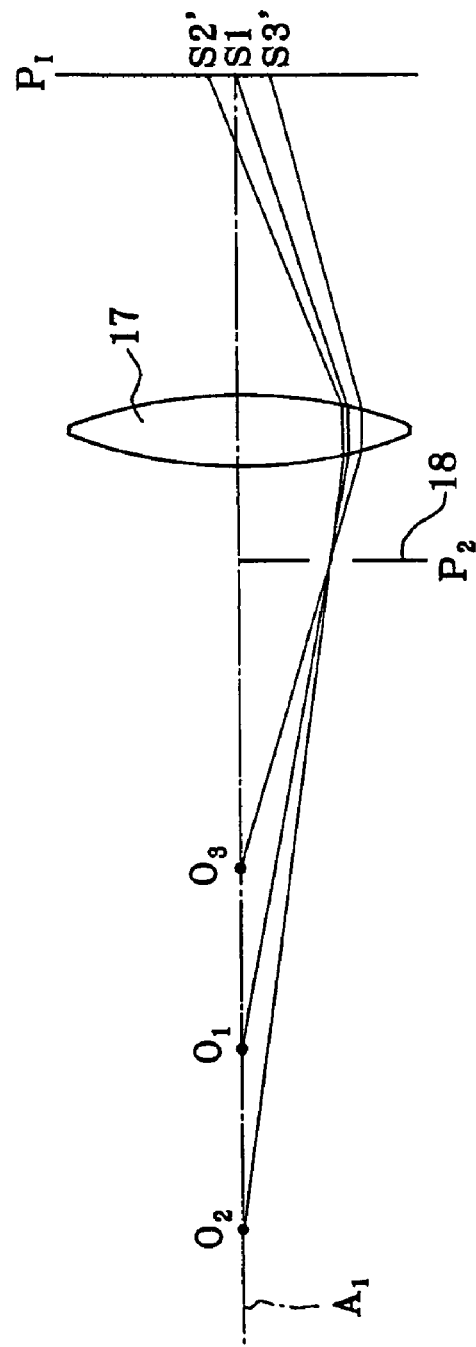

MANUAL FOCUS DEVICE AND AUTOFOCUS CAMERA

This is a divisional of Application No. 10/614,328 now U.S Pat. No. 7,099,575 filed Jul. 8, 2003. The entire disclosure of the prior application, application number 10/614,328, is hereby incorporated by reference.

BACKGROUND OF THE INVENTION

1. Field of the Invention

The present invention relates to a manual focus device and autofocus camera. More particularly, the present invention relates to a manual focus device and autofocus camera in which an in-focus state can be indicated and focusing can be easily effected.

2. Description Related to the Prior Art

Rangefinder incorporated cameras are well-known in the art of camera, in which a rangefinder of a double image coincidence type or a vertical image coincidence type is incorporated in a viewfinder. In the rangefinder incorporated camera, changes in a focused state due to focusing operation is observed as changes in a deviation between object images. Focusing with high precision is possible by observation with a human eye. The double image coincidence type of viewfinder has a view field where double images having an image through the viewfinder and an image through the rangefinder are observed. For focusing, the image through the rangefinder moving according to the focusing operation is adjusted and caused to coincide with the image through the viewfinder. The vertical image coincidence type of viewfinder uses a micro split image prism disposed in a light path in the viewfinder, and forms upper and lower split images of the object in a partial view field of the viewfinder. The upper and lower split images are moved horizontally in a symmetrical manner according to focusing operation. If an in-focus state is obtained, the split images coincide with one another.

There is a suggested structure of the viewfinder in JP-A 9-214813 and 2001-309210 in which an electronically photographed object image is utilized for focusing instead of incorporating the rangefinder for optically forming a double image or split images. According to this, double object images deviated according to a defocus amount are indicated with movement according to operation of focusing. It is possible to save and reduce a space and cost by reducing the number of parts for the optical structure.

For the purpose of the display of an image with movement in response to focusing and the display of coincidence of images at the time of the in-focus state, it is necessary to predetermine a defocus amount. According to the prior art, there are generally known methods including a triangulation method and a phase difference detection method. In the triangulation method, an object distance is measured by use of projecting and detecting infrared rays in order to calculate the defocus amount. In the phase difference detection method, two line sensors are used to receive object light through light paths symmetrical to each other with respect to the photographic optical axis, so as to calculate the defocus amount according to a phase difference between photoelectric signals from the line sensors.

Furthermore, an autofocus camera is well-known in which focusing is automatically effected. One example of autofocus camera includes an active type of rangefinder for projecting infrared rays. Another example of autofocus camera includes a passive type of rangefinder for utilizing object light. The rangefinder of any of those types operates according to the rangefinding of triangulation, in which an object distance is measured to obtain an in-focus position of a focusing lens for the purpose of focusing. Also, a digital still camera, video camera and other electronic equipment for photographing an image are known as the autofocus camera. A pickup element such as a CCD image sensor is utilized for picking up the object image. A contrast value is retrieved from the object image, and evaluated between pixels in each of frames. The focusing operation is automatically effected by obtaining a most highly sharpened contrast.

U.S. Pat. No. 6,453,124 (corresponding to JP-A 2001-281530) discloses the autofocus camera having a combined structure for focusing according to the contrast evaluation method and for focusing according to the phase difference detection method. In the phase difference detection method, the phase difference is detected between photoelectric signals of object light at points in two light paths which are symmetrical with respect to the photographic light axis, so an in-focus position can be determined by instantaneously obtaining an amount of defocus according to the phase difference. In this prior document, the lens is focused preliminarily according to the detection of the phase difference. After this, the lens is precisely focused by utilizing the evaluation of the contrast. This construction is effective in raising the speed of focusing operation without lowering the precision.

However, there occurs a high rise in the manufacturing cost for the construction to calculate the defocus amount according to the triangulation method. This is because of electric parts including the pickup element, a light projecting element for active rangefinding, a position detecting element and the like which require high precision in the incorporation. Similarly, the phase difference detection method requires a high manufacturing cost, because of an optical system for splitting and introducing object light, a line sensor, and other relevant elements.

SUMMARY OF THE INVENTION

In view of the foregoing problems, an object of the present invention is to provide a manual focus device and autofocus camera in which an in-focus state can be indicated and focusing can be easily effected.

In order to achieve the above and other objects and advantages of this invention, a manual focus device for a camera is provided, the camera including an aperture stop opening for introducing object light along a lens optical axis, and limiting a light amount of the object light, a taking lens system, having a focusing lens movable on the lens optical axis, set in an in-focus position to focus the object light on a focal plane, a pickup element, disposed on the focal plane, for outputting pickup data by picking up the object light. The manual focus device includes an aperture stop shifting mechanism for setting the aperture stop opening with reference to a first light amount gravity center by shifting the aperture stop opening in a first direction relative to the lens optical axis, and for setting the aperture stop opening with reference to a second light amount gravity center by shifting the aperture stop opening in a second direction reverse to the first direction relative to the lens optical axis, the first and second light amount gravity centers being equidistant from the lens optical axis. An image memory stores first and second sample pickup data obtained by picking up the object light on the pickup element when the aperture stop opening is set with reference to respectively the first and second light amount gravity centers. A display panel displays first and second sample images in combination according to the first and second sample pickup data, to indicate a present deviation of the focusing lens from the in-focus position in simulation. A lens driving mechanism is externally operable, for moving the focusing lens on the lens optical axis, and for actuation while the first and second sample images are checked visually, to position-the focusing lens when the first and second sample images inform a reach to the in-focus position.

The aperture stop shifting mechanism further changes a diameter of the aperture stop opening about the lens optical axis, to adjust the light amount for an exposure.

The first sample image has a form by shifting of an image represented by the pickup image in one of the first and second directions according to the present deviation of the focusing lens, the second sample image is symmetrical with the first sample image with respect to a center line of the image represented by the pickup image, and the first and second sample images become positioned with coincidence when the focusing lens is in the in-focus position.

The aperture stop shifting mechanism includes first and second aperture stop blades, having curved inner edges opposed to each other, for defining the aperture stop opening inside. First and second blade actuators shift respectively the first and second aperture stop blades in the first or second direction.

A frame of the display panel includes first and second split regions being partial, and a main region or background region formed outside the first and second split regions. The image memory stores data of the first and second sample images obtained by subjecting the first and second sample pickup data to trimming processing according to the first and second split regions. Furthermore, a main image memory stores data of an object image obtained by subjecting the pickup data to trimming processing according to the background region.

The first and second directions are horizontal, and the first and second split regions are adjacent vertically with one another.

The first and second split regions are located at a center of the background region, or near to the center.

The display panel is constituted by a viewfinder for observing an object.

In a preferred embodiment, the camera further comprises a viewfinder for observing an object. The display panel is disposed in a rear of the camera and under the viewfinder.

Furthermore, a defocus determiner processes the first and second sample pickup data in a phase difference detection processing, and obtains defocus information of the present deviation of the focusing lens from the in-focus position.

Furthermore, a shifting amount detector detects a shifting amount of the lens driving mechanism. An image outputting circuit corrects the first and second sample images on the display panel according to the shifting amount of the lens driving mechanism. When the shifting amount comes up to a value corresponding to the defocus information, the first and second sample images inform the reach to the in-focus position.

Furthermore, a gain controller amplifies the pickup data in,consideration of a predetermined brightness level.

The gain controller further obtains pixel mixing pickup data by obtaining an arithmetic average of the pickup data of N adjacent pixels, and substitutes the pixel mixing pickup data for the pickup data of the N adjacent pixels, whereby the pixel mixing pickup data is provided with N times as high contrast as the pickup data.

Furthermore, a mode switch is turned on to set a high contrast mode. When the high contrast mode is set, the gain controller obtains the pixel mixing pickup data to provide high contrast.

When the aperture stop shifting mechanism is set at the first and second light amount gravity centers, a diameter of the aperture stop opening is smaller than a diameter of the aperture stop opening in a fully open state.

According to one aspect of the invention, an autofocus camera includes a taking lens system, having a focusing lens set in an in-focus position on a lens optical axis, for focusing object light on a focal plane. A lens driving mechanism moves the focusing lens on the lens optical axis. A pickup element is disposed on the focal plane, for outputting pickup data by picking up the object light. An aperture stop opening introduces the object light along the lens optical axis, and limits a light amount of the object light. An aperture stop shifting mechanism sets the aperture stop opening with reference to a first light amount gravity center by shifting the aperture stop opening in a first direction relative to the lens optical axis, and sets the aperture stop opening with reference to a second light amount gravity center by shifting the aperture stop opening in a second direction reverse to the first direction relative to the lens optical axis, the first and second light amount gravity centers being equidistant from the lens optical axis. A controller outputs first and second sample pickup data obtained by picking up the object light on the pickup element when the aperture stop opening is set with reference to respectively the first and second light amount gravity centers, obtains an in-focus position by a process of comparison and evaluation of the first and second sample pickup data, and drives the lens driving mechanism in accordance therewith.

The controller includes an image comparator for operating in a phase difference detection processing, to obtain a phase difference detection processing result by comparison between the first and second sample pickup data. A defocus determiner obtains defocus information to move the focusing lens to the in-focus position according to the phase difference detection processing result.

Furthermore, a comparator determines whether brightness according to the pickup data is a low brightness by comparison with threshold data. When the brightness according to the pickup data is the low brightness, the gain controller amplifies the first and second sample pickup data.

Furthermore, a comparator determines whether brightness according to the pickup data is a low brightness by comparison with threshold data. A contrast determiner outputs contrast distribution information according to the pickup data. When the brightness according to the pickup data is the low brightness, the controller inhibits the aperture stop shifting mechanism from shifting toward the first and second light amount gravity centers, causes the aperture stop shifting mechanism to open fully the aperture stop opening, moves the focusing lens, and checks a change in the contrast distribution information in moving the focusing lens, to determine the in-focus position in accordance therewith.

The contrast distribution information is a finite difference between maximum and minimum brightness levels of an image according to the pickup data, and when the finite difference is greatest, then the focusing lens is judged as set in the in-focus position.

Furthermore, a temporary memory stores preceding pickup data prior to the pickup data from the pickup element, and stores the pickup data in response to a change in an output of the pickup element by overwriting with the preceding pickup data. The image comparator further checks the output change of the pickup element in a time-sequential manner, and compares the pickup data with the preceding pickup data, to output time-sequential comparison information. An image shake compensator subjects the pickup data to image shake compensation according to the comparison information.

According to another aspect of the invention, an autofocus camera has an aperture stop shifting mechanism for setting the aperture stop opening with reference to a first light amount gravity center by shifting the aperture stop opening in a first direction relative to the lens optical axis, and for setting the aperture stop opening with reference to a second light amount gravity center by shifting the aperture stop opening in a second direction reverse to the first direction relative to the lens optical axis, the first and second light amount gravity centers being equidistant from the lens optical axis. An aperture stop shifting circuit controls the aperture stop shifting mechanism sequentially in first, second and third shifting steps, wherein the aperture stop shifting circuit, when in the first shifting step, sets the aperture stop opening with reference to the first light amount gravity center, then shifts and sets the aperture stop opening with reference to the second light amount gravity center, the aperture stop shifting circuit, when in the second shifting step, shifts the aperture stop opening in the first direction from the second light amount gravity center, the aperture stop shifting circuit, when in the third shifting step, sets the aperture stop opening with reference to the first light amount gravity center, then shifts and sets the aperture stop opening with reference to the second light amount gravity center. A controller outputs first and second sample pickup data associated with respectively the first and second light amount gravity centers during the first shifting step by picking up the object light in the pickup element, outputs third and fourth sample pickup data associated with respectively the first and second light amount gravity centers during the third shifting step by picking up the object light in the pickup element, determines a first deviation between the first and second sample pickup data or between the third and fourth sample pickup data, determines a second deviation between the first and third sample pickup data or between the second and fourth sample pickup data, determines a finite difference between the first and second deviations, determines the in-focus position by evaluating the finite difference, and causes the lens driving mechanism to move the focusing lens to the in-focus position.

The aperture stop shifting circuit is so constructed that the first, second and third shifting steps take time of lengths equal to one another.

BRIEF DESCRIPTION OF THE DRAWINGS

The above objects and advantages of the present invention will become more apparent from the following detailed description when read in connection with the accompanying drawings, in which:

FIG. 5A is an explanatory view illustrating an image deviation caused by a shift of an aperture stop opening to the right;

FIG. 5B is an explanatory view illustrating an image deviation caused by a shift of an aperture stop opening to the left;

DETAILED DESCRIPTION OF THE PREFERRED EMBODIMENT(S) OF THE PRESENT INVENTION

Figure 1:
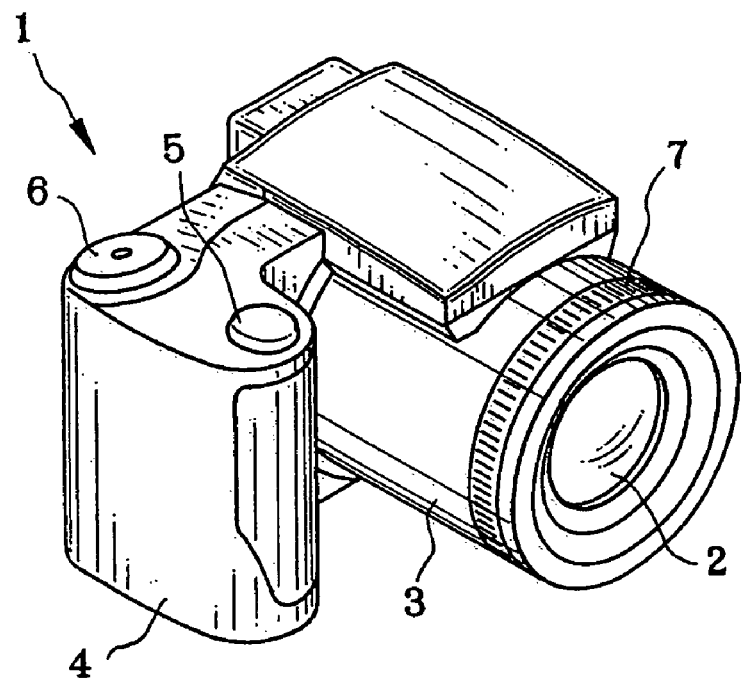
FIG. 1 is a perspective illustrating a manual focus type of digital still camera.

In FIG. 1, a digital still camera 1 of the invention is constituted by a lens barrel 3, a grip 4, a release button 5 and a mode selection dial 6 as mode switch. A taking lens system 2 is mounted in the lens barrel 3. The release button 5 has a construction depressible in a halfway, step and a fully depressed step. A focusing ring 7 of a focusing lens driving mechanism is disposed around the lens barrel 3, and rotatable for focusing the taking lens system 2 to a photographic object.

Figure 2:
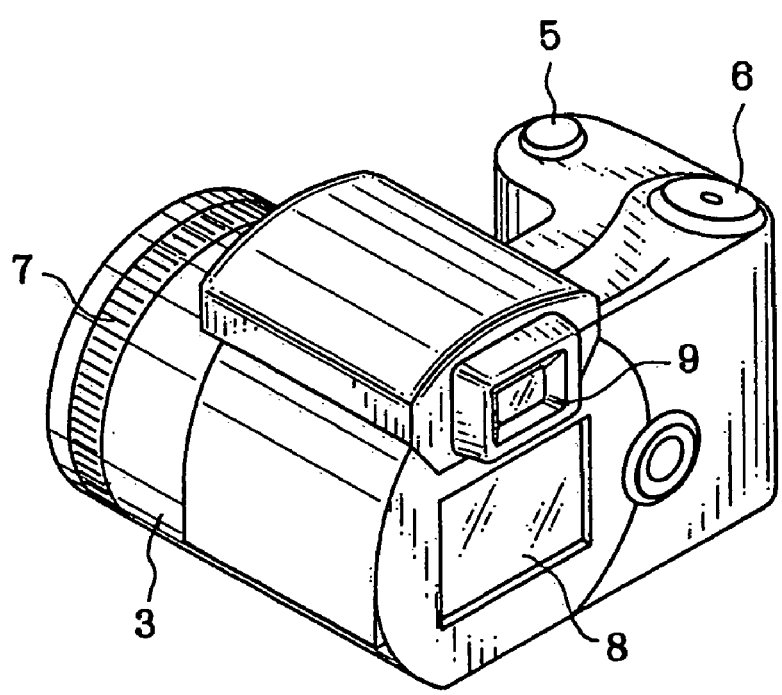
FIG. 2 is a rear perspective illustrating the camera.

In FIG. 2, the rear of the digital still camera 1 has a back monitor display panel 8 and a viewfinder 9 with a display panel. The monitor display panel 8 is a liquid crystal display panel of a full-color type to indicate an object image. Also, a small type of a color liquid crystal display panel is incorporated in the viewfinder 9. The monitor display panel 8 and the viewfinder 9 are controlled for selective operation. When the viewfinder 9 is used, the monitor display panel 8 is kept turned off forcibly. The use of the viewfinder 9 makes it possible to save power effectively in comparison with the use of the monitor display panel 8.

Figure 3:
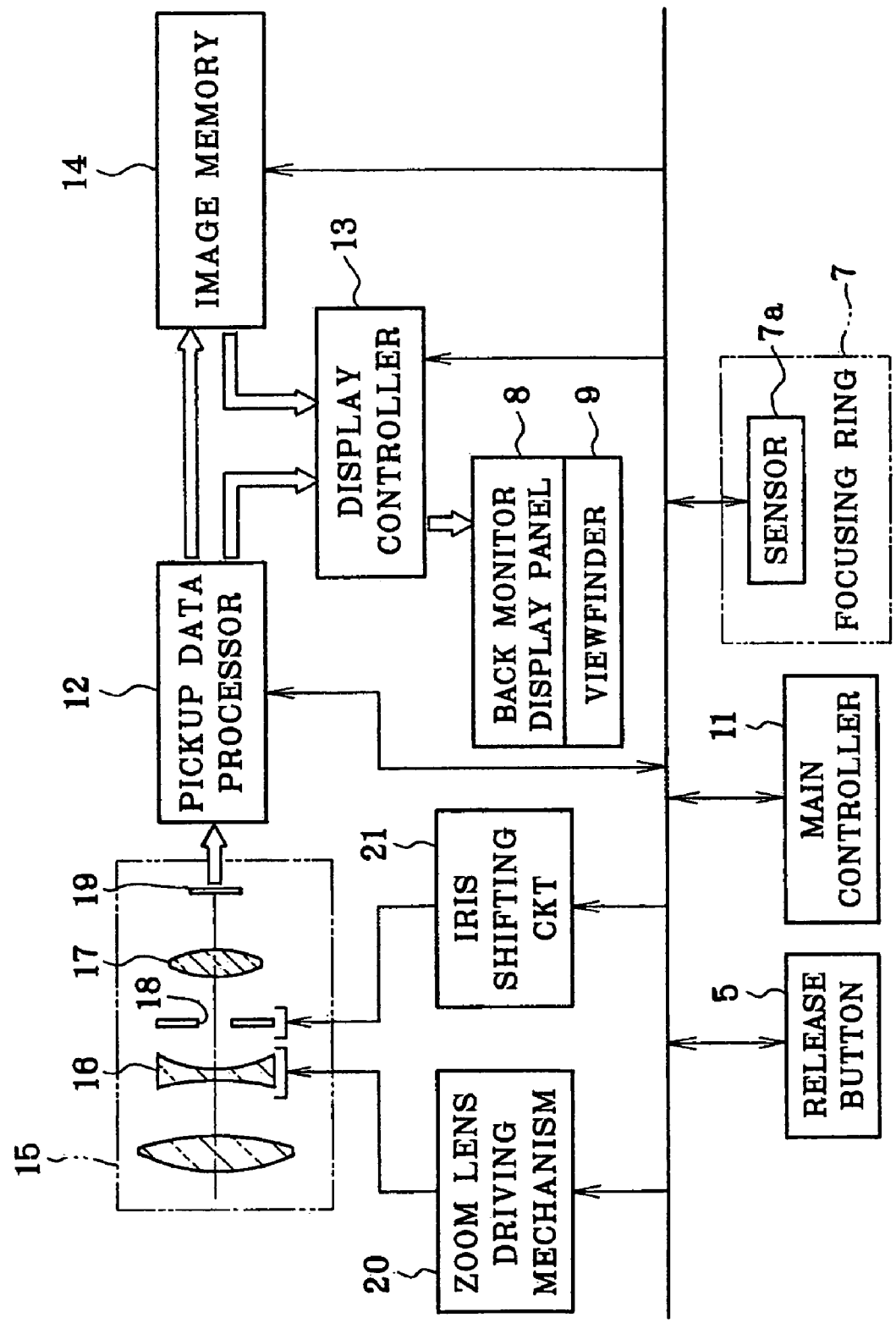
FIG. 3 is a block diagram schematically illustrating the camera.

In FIG. 3, the digital still camera 1 includes a main controller 11, a pickup data processor 12, a display controller 13 and an image memory 14. The main controller 11 operates according to pre-programmed sequences, outputs control signals to relevant sections, and administrates electric operation of the camera. The pickup data processor 12 is supplied by a CCD pickup unit 15 with pickup data, and subjects the pickup data to amplification and image processing. The display controller 13 outputs an image of a photographic object for display in the monitor display panel 8 or the viewfinder 9 as a small monitor. The image memory 14 stores image data according to the pickup data output by the pickup data processor 12 upon a full depression of the release button 5.

The CCD pickup unit 15 is constituted by a zoom lens 16, a focusing lens 17, an aperture stop opening 18, and a CCD pickup element 19 or imaging element. A zoom lens driving mechanism 20 includes a zoom motor, and drives the zoom lens 16 in a direction along an optical axis. The zoom lens 16 optically zooms an object image focused on the CCD pickup element 19. The focusing lens 17 is moved in the optical axis direction upon rotation of the focusing ring 7, and focuses object light on the CCD pickup element 19 in an in-focus position according to an object distance. A focusing ring sensor 7a as shifting amount detector is associated with the focusing lens 17, and detects a rotational shifting amount of the focusing lens 17. An iris shifting circuit 21 in an aperture stop shifting mechanism changes a diameter of the aperture stop opening 18 defined in an aperture stop unit, and also shifts the aperture stop opening 18 in a direction toward and away from the aperture stop opening 18 within a plane perpendicular to the optical axis.

Figure 4:
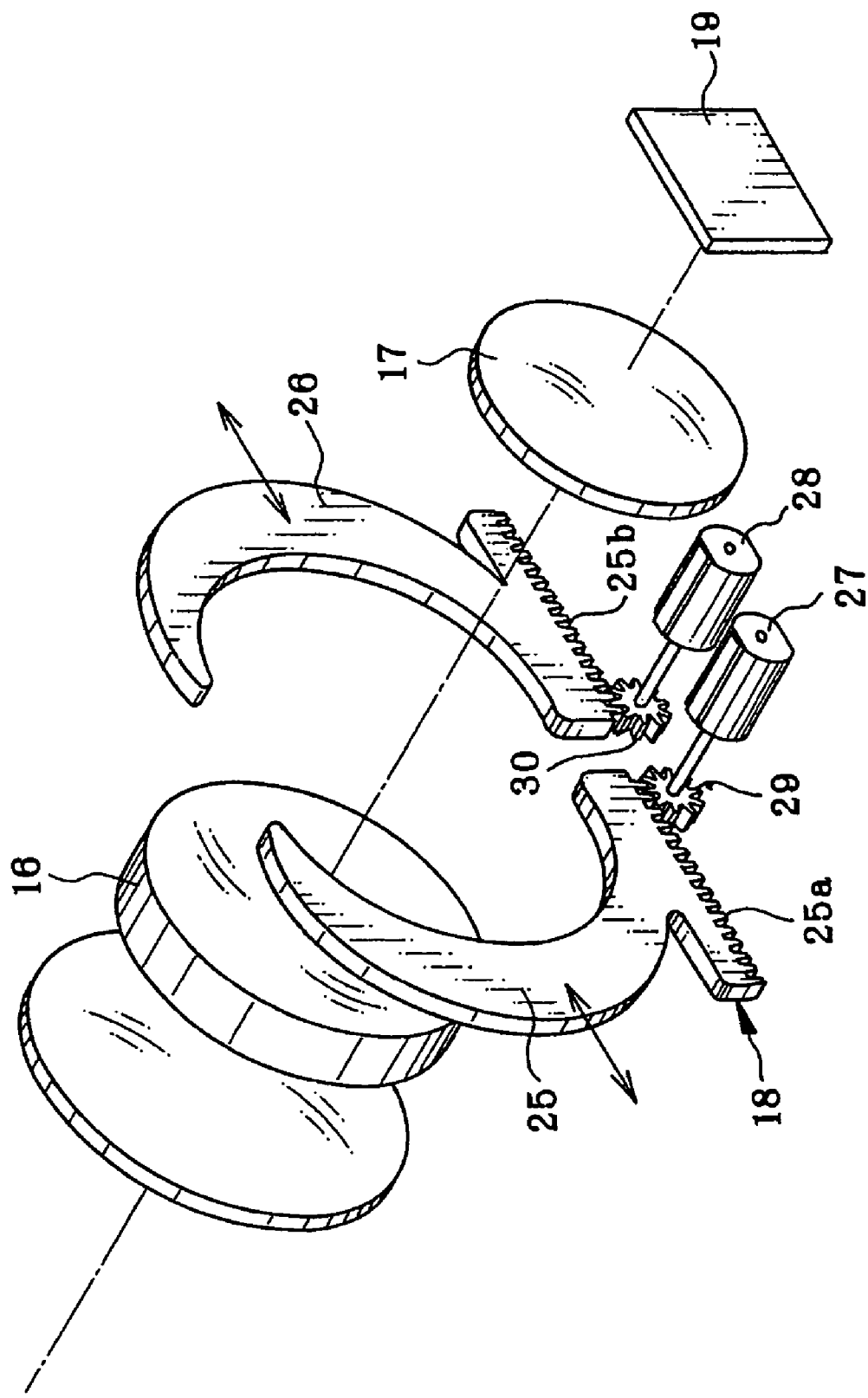
FIG. 4 is an exploded perspective illustrating an iris driving mechanism in the camera.

In FIG. 4, the aperture stop opening 18 is defined by a pair of aperture stop blades 25 and 26 in the aperture stop shifting mechanism. Rack portions 25a and 26a are formed with respectively the underside of the aperture stop blades 25 and 26. Iris motors 27 and 28 as blade actuators drive respectively the aperture stop blades 25 and 26. Pinions 29 and 30 are fastened on respectively output shafts of the iris motors 27 and 28, and meshed with the rack portions 25a and 26a. As the rack portions 25a and 26a are driven by the pinions 29 and 30, the aperture stop blades 25 and 26 move horizontally in an individual manner from one another, to adjust a diameter of the aperture stop opening 18 continuously, and to shift the aperture stop opening 18 for light amount gravity centers.

In FIGS. 5A and 5B, the aperture stop opening 18 is shiftable between two light amount gravity centers P1 and P2, which are disposed symmetrical to each other with respect to an optical axis. In FIG. 5A, a state of focusing light from an object point O1 to a pickup surface $P_I$ by use of the focusing lens 17 is depicted. Also, a shift of the aperture stop opening 18 to the light amount gravity center P1 on a right side is depicted. A light line R1 from an object point O1 reaches a point S1 that is disposed on the pickup surface $P_I$ and on the optical axis A1. A light line R2 from an object point 02 that is farther from the object point O1 intersects with the optical axis A1 in front of the pickup surface $P_I$, and reaches a point S2 that is disposed on the pickup surface $P_I$. A light line R3 from an object point O3 that is nearer from the object point O1 reaches a point S3 that is disposed on the pickup surface $P_I$ without intersecting with the optical axis A1. When the aperture stop opening 18 shifts to the light amount gravity center P2 on a left side, the light lines R1, R2 and R3 reach the points S1, S2' and S3' that are disposed on the pickup surface $P_I$. See FIG. 5B.

Figure 6A:
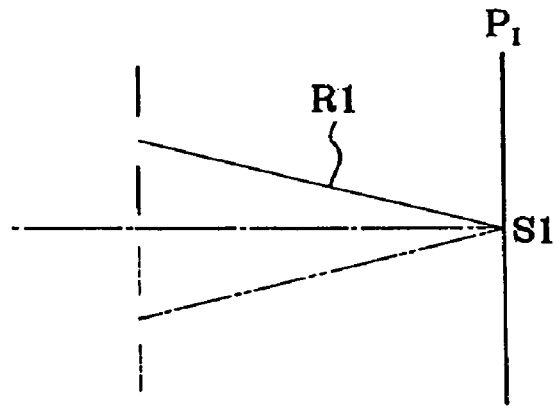
FIG. 6A is an explanatory view illustrating an in-focus state with a path of light without image deviation.
Figure 6B:
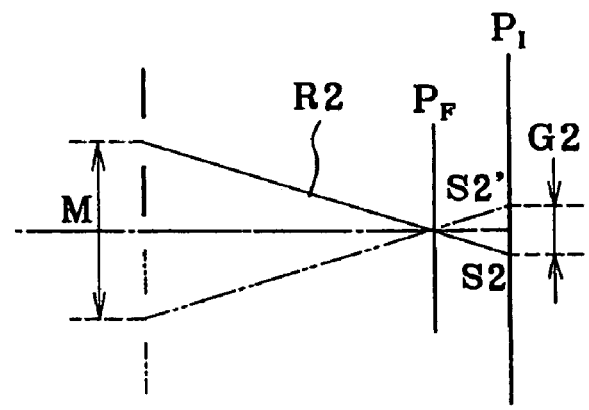
FIG. 6B is an explanatory view illustrating a front focus state and a size of an image deviation.
Figure 6C:
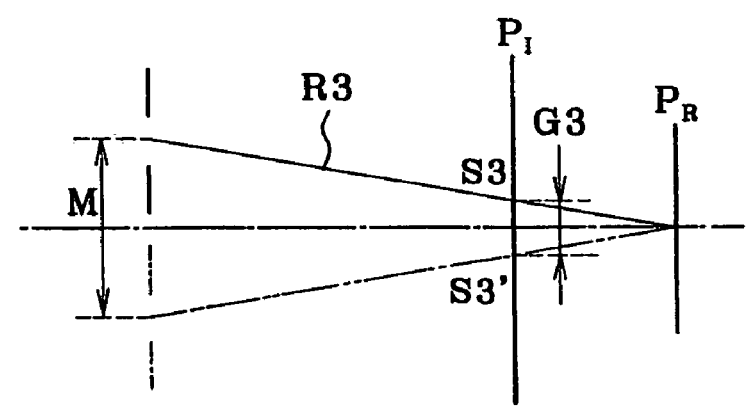
FIG. 6C is an explanatory view illustrating a rear focus state and a size of an image deviation.

In FIG. 6A, light from the object point O1 is focused on the pickup surface $P_I$, to obtain an in-focus state. In FIG. 6B, light from the object point O2 is focused at a point PF in front of the pickup surface $P_I$, which is a front focus state. An image deviation G2 of an image in the front focus state is a distance between the points S2 and S2'. In FIG. 6C, light from the object point O3 is focused at a point PR behind the pickup surface $P_I$, which is a rear focus state. The image deviation G2 in the front focus state is determined positive. An image deviation G3 in the rear focus state is determined negative. According to the positive and negative directions, movement of the focusing lens 17 can be indicated in a clarified manner.

If a distance from the aperture stop opening 18 to the pickup surface $P_I$ is sufficiently smaller than a subject distance, two triangles are formed with a relationship approximated as similar to each other by straight lines connecting centers of the aperture stop opening 18 set in the plural positions and a light path of main light lines reaching the pickup surface $P_I$. A ratio of the similarity between the triangles can be obtained according to a shifted distance M of the back-and-forth shift of the aperture stop opening 18 and an image deviation G. This is effective in obtaining the defocus amount or deviation of focus, namely a distance between the pickup surface $P_I$ and a focal plane associated with each of subject distances. The defocus amount being obtained, a distance from a present position of the focusing lens 17 to an in-focus position can be found.

Figure 7:
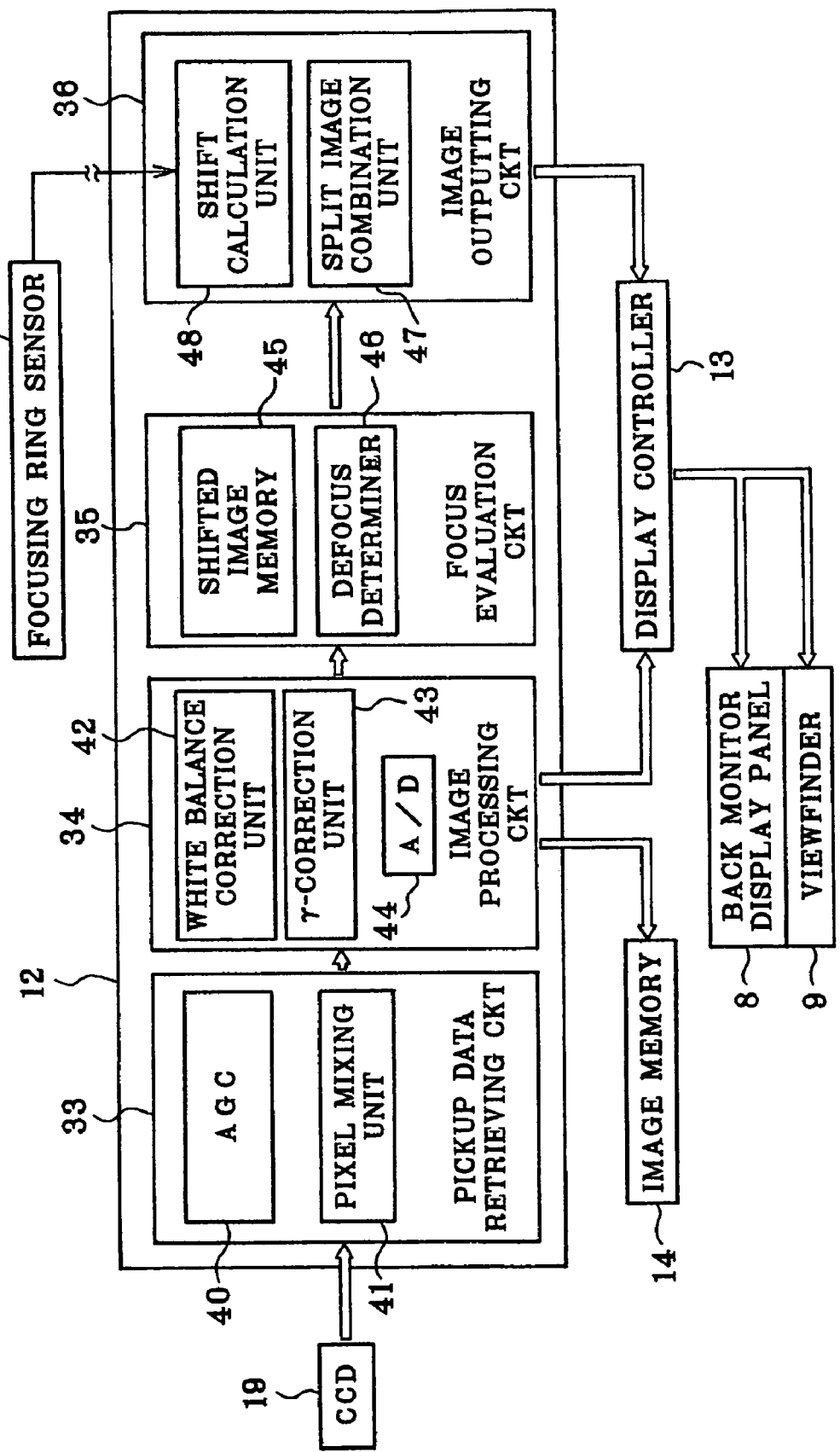
FIG. 7 is a block diagram schematically illustrating a pickup data processor.

In FIG. 7, the pickup data processor 12 is constituted by a pickup data retrieving circuit 33 or brightness determiner, an image processing circuit 34, a focus evaluation circuit 35 and an image outputting circuit 36. The pickup data retrieving circuit 33 includes an auto gain control (AGC) unit 40 and a pixel mixing unit 41 with an adder as gain controller. The AGC unit 40 for amplification adjusts the gain to regularize an average level of an output signal of the CCD pickup element 19, and interpolates brightness of each of the pixels. The pixel mixing unit 41 effects addition of brightness values of plural adjacent pixels in an image frame, substitutes the added brightness for initial brightness of the plural adjacent pixels, to correct contrast of an image by lowering resolution. The AGC unit 40 and the pixel mixing unit 41 are selectively operated according to an initially determined setting.

The image processing circuit 34 is constituted by a white balance correction unit 42, a gamma correction unit 43, and an A/D converter 44. The white balance correction unit 42 amplifies the pickup data according to predetermined gains for R, G and B, for adjustment of the white balance. The gamma correction unit 43 corrects the contrast gamma of the pickup data. After the correction, the pickup data is converted by the A/D converter 44 into a digital form of image data.

The focus evaluation circuit 35 has a shifted image memory 45 and a defocus determiner 46. The shifted image memory 45 stores two images of frames picked up in the course of shifting the aperture stop opening 18. The defocus determiner 46 analyzes two object images being stored, to obtain an image deviation between positions of the images by utilizing pixels. According to the image deviation, a defocus amount or deviation of focus is calculated, and sent to the image outputting circuit 36.

The image outputting circuit 36 is constituted by a split image combination unit 47 and a shift calculation unit 48. The split image combination unit 47 receives data of images of the two frames read from the shifted image memory 45, subjects those to trimming processing, and combines them together, for conversion to split images for the purpose of displaying a state of focusing. The shift calculation unit 48 treats a change in the deviation of the focus according to rotation of the focusing ring 7, and converts the change into a shifting amount in the displayed split images.

Figure 8:
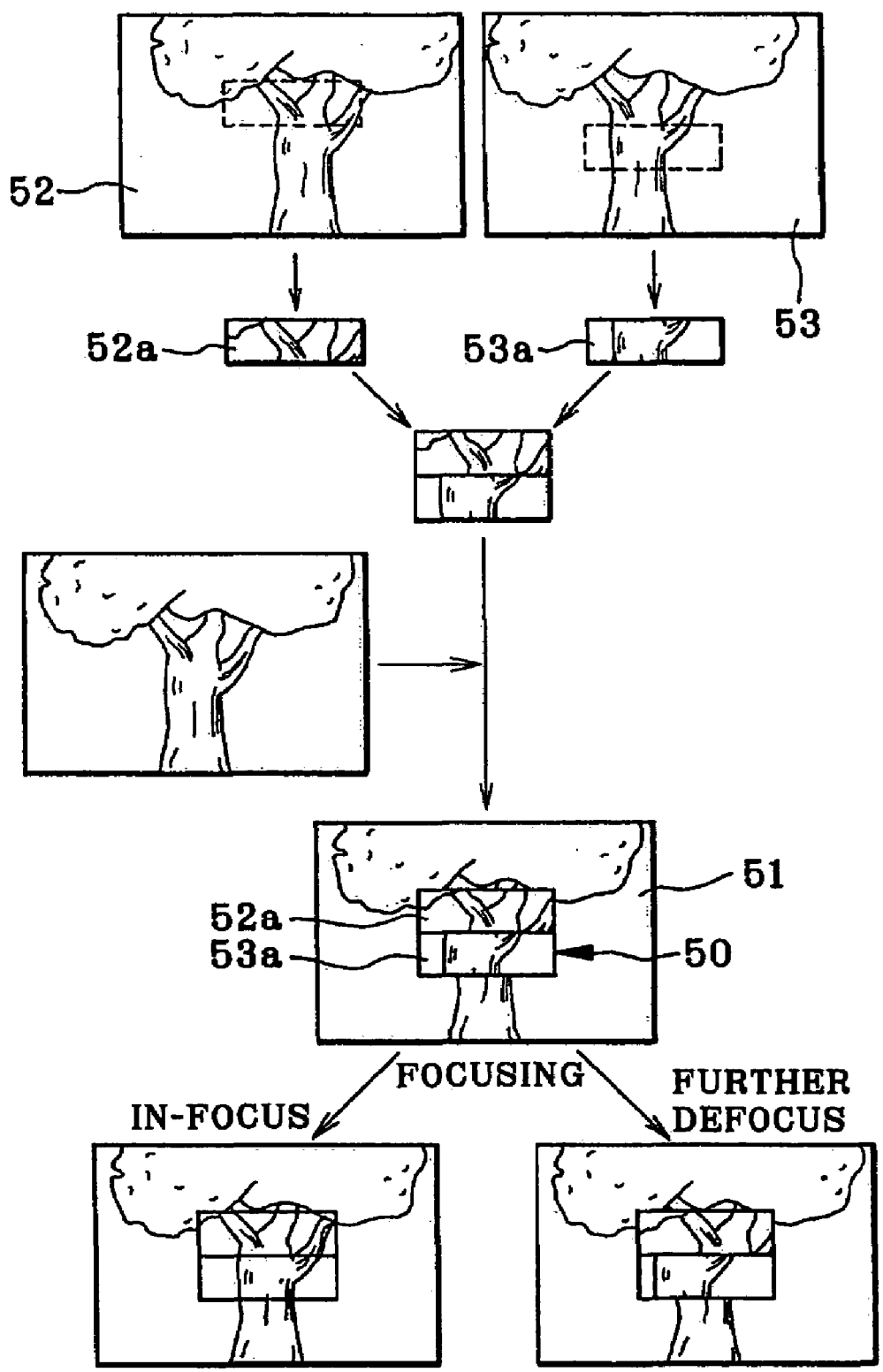
FIG. 8 is an explanatory view illustrating a series of various images combined in the camera, including a completed state of an image on a display panel.

The display controller 13 receives data of an image output by the image processing circuit 34 and split sample images output by the image outputting circuit 36, and causes the monitor display panel 8 and/or the viewfinder 9 to indicate those images. In FIG. 8, the entirety of the frame is constituted by a main region or background region 51 or photographic field display region, and a focus adjusting region 50 surrounded by the background region 51. When a center of the aperture stop opening 18 is located on the optical axis, the background region 51 displays an object image being picked up. The focus adjusting region 50 is constituted by first and second split regions. A split sample image. 52a in the first split region is a portion of a right-shifted object image 52. A split sample image 53a in the second split region is a portion of a left-shifted object image 53. Note that the right-shifted object image 52 is obtained when the aperture stop opening 18 is shifted to the left as viewed from a user holding the camera. The left-shifted object image 53 is obtained when the aperture stop opening 18 is shifted to the right. This is the result of the rear focus condition.

Note that, in uppermost portions of FIG. 8, the contours of the right and left-shifted object images 52 and 53 are clearly depicted for the purpose of understanding, but are actually in an unsharply focused form because of the step prior to the focus adjustment.

Referring again to FIG. 6B illustrating the front focus point PF, the focal plane of the focusing lens 17 is located in front of the pickup surface $P_I$ of the CCD pickup element 19. According to the shift of the aperture stop opening 18 to the right, object light becomes incident upon a position offset to the left on the pickup surface $P_I$, so that the split sample image comes to have a form in which an original position of the object is shifted to the right. Similarly, the split sample image according to the shift of the aperture stop opening 18 to the left comes to have a form in which the original position of the object is shifted to the left.

Referring now to FIG. 6C illustrating the rear focus point PR, the focal plane of the focusing lens 17 is located behind the pickup surface $P_I$ of the CCD pickup element 19. According to the shift of the aperture stop opening 18 to the right, object light becomes incident upon a position offset to the right on the pickup surface $P_I$, so that the split sample image comes to have a form in which an original position of the object is shifted to the left. Similarly, the split sample image according to the shift of the aperture stop opening 18 to the left comes to have a form in which the original position of the object is shifted to the right.

When the focusing ring 7 is rotated manually, information of a rotating amount of the focusing ring 7 is detected by the focusing ring sensor 7a, and sent into the shift calculation unit 48 by the main controller 11. According to the rotating amount, the shift calculation unit 48 calculates an amount of shifting the displayed split sample images. In accordance with a result from the shift calculation unit 48, the split image combination unit 47 changes positions of trimming processing for the images of the two frames stored in the shifted image memory 45, newly obtains a secondary combination of the split sample images, and outputs information of the combination to the display controller 13. Each time that the focusing ring 7 is rotated, the split sample images 52a and 53a in the focus adjusting region 50 are displayed with a shift, and kept symmetrical with each other with respect to the vertical center line. If the defocus amount or deviation of focus decreases, a displayed deviation between the split sample images decreases until positions of the split sample images coincide to display an in-focus state. If the defocus amount increases, a displayed deviation between the split sample images increases, to indicate that being out of focus becomes more remarkable.

Figure 9:
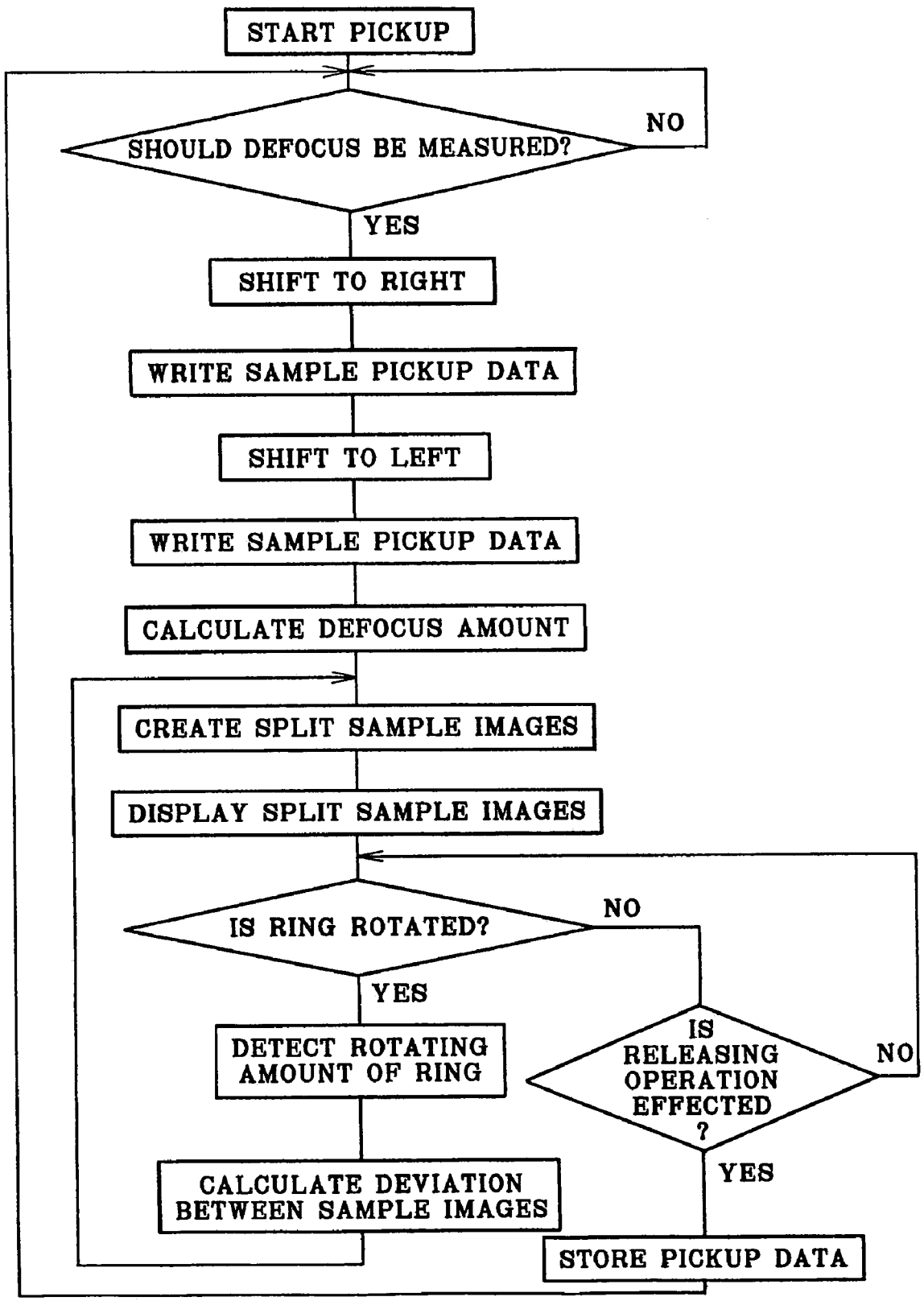
FIG. 9 is a flow chart illustrating a process of focus adjustment and pickup.

The operation of the embodiment is described with reference to FIG. 9. When the CCD pickup element 19 is driven, the camera starts picking up object light from a photographic object. The pickup data retrieving circuit 33 is supplied with pickup data of respectively frames at a constant speed of picking up. The pickup data is subjected by the pickup data retrieving circuit 33 to processing of amplification or pixel mixture per one frame, to correct brightness of the image. The pickup data is output to the display controller 13, to cause a display panel to display the object image of the frames continuously as a result of picking up.

After pickup is started, the release button 5 is depressed halfway. Otherwise, the focusing ring 7 is rotated at a very small rotational angle. This starts measurement of a defocus amount or deviation of focus. A shift starting signal is sent by the main controller 11 to the iris shifting circuit 21, which drives the iris motors 27 and 28 in such a manner as to rotate the pinions 29 and 30 in the same rotational direction. The aperture stop blades 25 and 26 shift in the same direction, to displace the position of the aperture stop opening 18 laterally.

When shifting of the aperture stop opening 18 is started, the display controller 13 causes the display panel to display the object image in a frozen form. At first, the iris shifting circuit 21 shifts the aperture stop opening 18 to the right. When the aperture stop opening 18 has moved at a predetermined distance, the shifting to the right is stopped. Then pickup data output by the CCD pickup element 19 is sent to the focus evaluation circuit 35, to write the data of the left-shifted object image 53 to the shifted image memory 45. This is a state at the time of the rear focus. In the case of the front focus, a right-shifted object image is written.

Then the iris shifting circuit 21 shifts the aperture stop opening 18 in the direction to the left. The aperture stop opening 18 is moved to a set position that is symmetrical to the right-side set position with respect to the optical axis. Upon the stop of the shift to the left, pickup data output by the CCD pickup element 19 is sent to the focus evaluation circuit 35, to write data of the right-shifted object image 52 to the shifted image memory 45. This is because of the rear focus. In the case of the front focus, a left-shifted object image is written.

The aperture stop opening 18 is shifted back to the center or optical axis. The display panel is caused to restart displaying an object image in a motion picture manner after ending displaying the frozen image. In the focus evaluation circuit 35, data of two frames of images stored in the shifted image memory 45 is read, and sent to the defocus determiner 46. The defocus determiner 46 checks and obtains an image deviation, and calculates a defocus amount or deviation of focus according to the image deviation. The image outputting circuit 36 is supplied with the calculated deviation of the focus as defocus information.

The split image combination unit 47 creates data of primary split sample images to be displayed in the focus adjusting region 50. The primary split sample images are output and sent to the display controller 13. The focus adjusting region 50 appears in the screen of the display panel. Upon rotation of the focusing ring 7, information of its rotating amount is sent to the shift calculation unit 48. The shift calculation unit 48 calculates a deviation of displayed images according to the information of the rotating amount. Secondary split sample images are created by considering the deviation of the displayed images. The secondary split sample images are output and sent to the display controller 13. Images are displayed in a split manner shifted in horizontally symmetrical directions to the right and the left.

At each time that the focusing ring 7 is rotated, processing of moving a split sample image is effected. When the focusing lens 17 comes near to the in-focus position, a deviation between the split sample images decreases. When the focusing lens 17 becomes in-focus, the split sample images coincide with one another. When the release button 5 is fully depressed, a releasing operation signal is sent to the main controller 11. The image data output by the image processing circuit 34 is sent and written to the image memory 14 in a form picked up at the releasing time. After the writing, the focus adjusting region 50 disappears in the display panel. Only the background region 51 remains indicated in the display panel.

Note that, in the present embodiment, the aperture stop opening 18 is shifted between the two light amount gravity centers that are horizontally symmetrical with one another. The focus adjusting region 50 is defined to lie on the center of the frame. However, amounts of shifting the aperture stop opening 18 may be asymmetrical in view of the horizontal direction. The focus adjusting region 50 can be defined to lie in a position offset from the center of the frame. Furthermore, it is possible to add a structure to shift the aperture stop opening 18 in a vertical direction, so as to shift the aperture stop opening 18 two-dimensionally. This is effective in defining the focus adjusting region 50 in any suitable position offset from the center of the frame.

In the above embodiment, the object images picked up at the time of moving the aperture stop opening 18 are used to form split sample images. However, other methods for obtaining coincidence of images for the purpose of focusing may be used, for example, a method of double image coincidence. A reference image and a movable sample image may be displayed in an overlapped manner. The reference image can be predetermined as a still image without shift. The movable sample image may be displayed with sufficient transmittance so that the reference image can be observed through the movable sample image. According to this, a double image coincidence can be utilized for focusing operation. Furthermore, it is possible to use a selectable structure between the split sample image display and the double image coincidence.

It is conceivable to desire still higher precision in the focusing. For this purpose, a defocus amount or deviation of focus may be obtained previously, so that a focused state can be indicated by an auxiliary form of enlarging the indicated deviation between the split sample images. Any suitable structure of an auxiliary form may be used for the highly precise focusing. For example, an auxiliary indicia, such as triangular or circular indicia, can be indicated in a moving manner relative to a reference image, without using the object image itself for the auxiliary form. Also, it is possible in the present invention to inform an in-focus state, a front focus state and a rear focus state in an auxiliary manner, and to inform movement of the focusing lens toward and away from the in-focus position. To this end, plural light sources in a small size may be used to indicate changes in the focus in a visual manner.

Note that the aperture stop opening is shifted repeatedly to the two light amount gravity centers so as to pick up and store images. This is effective in changing the split sample images 52a and 53a continuously in response to shifts of the focusing ring 7. The focusing ring 7 can be manually operated until the forms of the sample images visually come to coincide with one another for the purpose of focus adjustment. Therefore, it is possible in the manual focus camera not to install the defocus determiner 46 and the shift calculation unit 48 as well as the focusing ring sensor 7a.

The arithmetic operation of the phase difference detection may not be effected. The focus may be adjusted only observing the monitor display panel 8 or the viewfinder 9 and operating the focusing ring 7.

Figure 10:
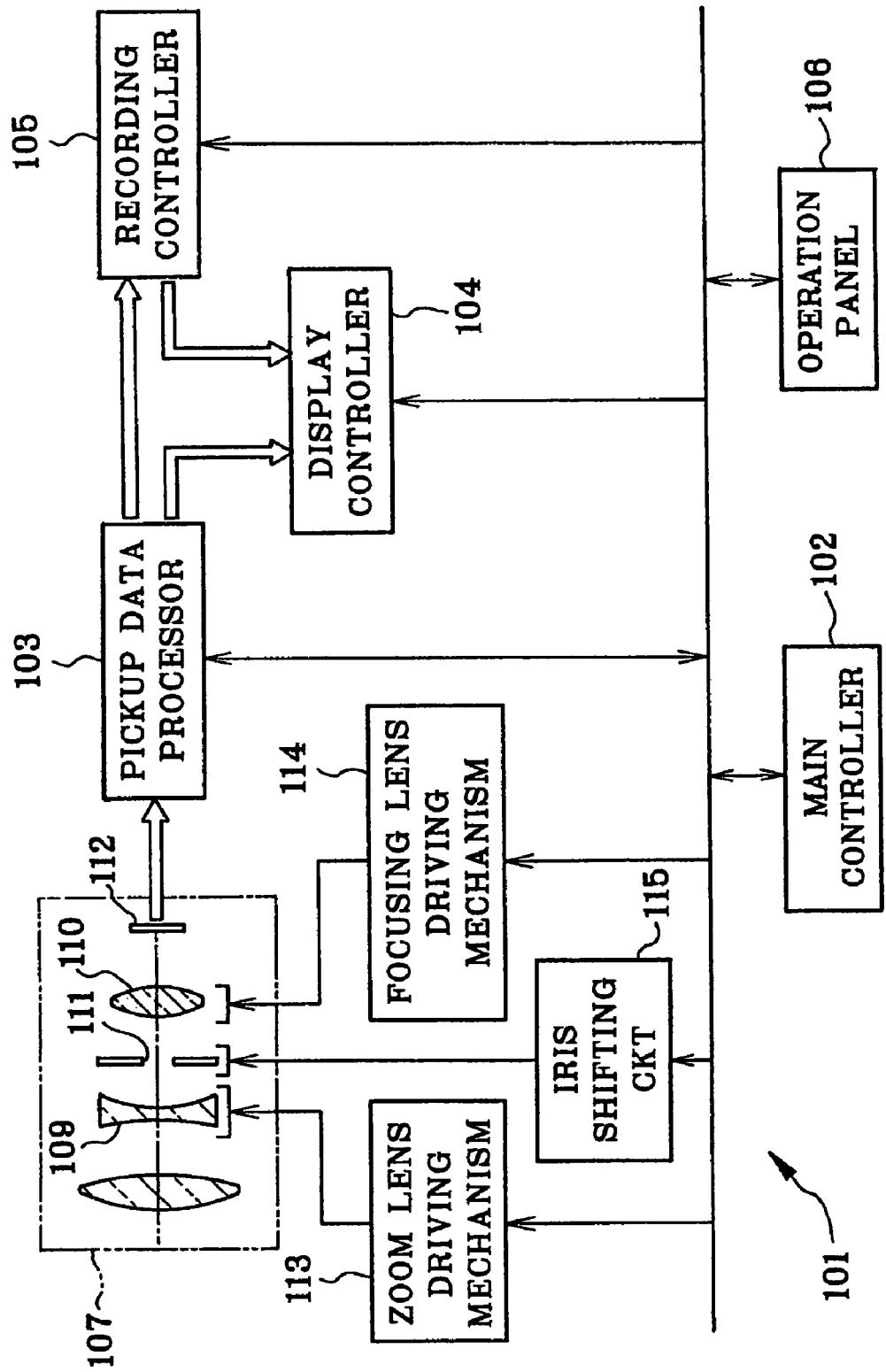
FIG. 10 is a block diagram schematically illustrating an autofocus type of digital still camera according to one preferred embodiment.

An autofocus camera according to one aspect of the invention is described with reference to FIGS. 10–13. In FIG. 10, a digital still camera 101 of autofocus type includes a main controller 102, a pickup data processor 103 as controller, a display controller 104, a recording controller 105, and an operation panel 106 as mode switch. The recording controller 105 controls recording of a motion picture image or still image to a video tape, memory card or the like. The operation panel 106 supplies the main controller 102 with an operation signal which is generated upon operation of a recording button, a still image recording button (not shown) or the like.

A CCD pickup unit 107 is constituted by a zoom lens 109, a focusing lens 110, an aperture stop opening 111, and a CCD pickup element 112. A zoom lens driving mechanism 113 is provided with a zoom motor, operates to move the zoom lens 109 in an optical axis direction, optically to change a size of an object image focused on the CCD pickup element 112. A focusing lens driving mechanism 114 has a focusing motor, operates to move the focusing lens 110 in the optical axis direction, to focus object light on the CCD pickup element 112.

Figure 11:
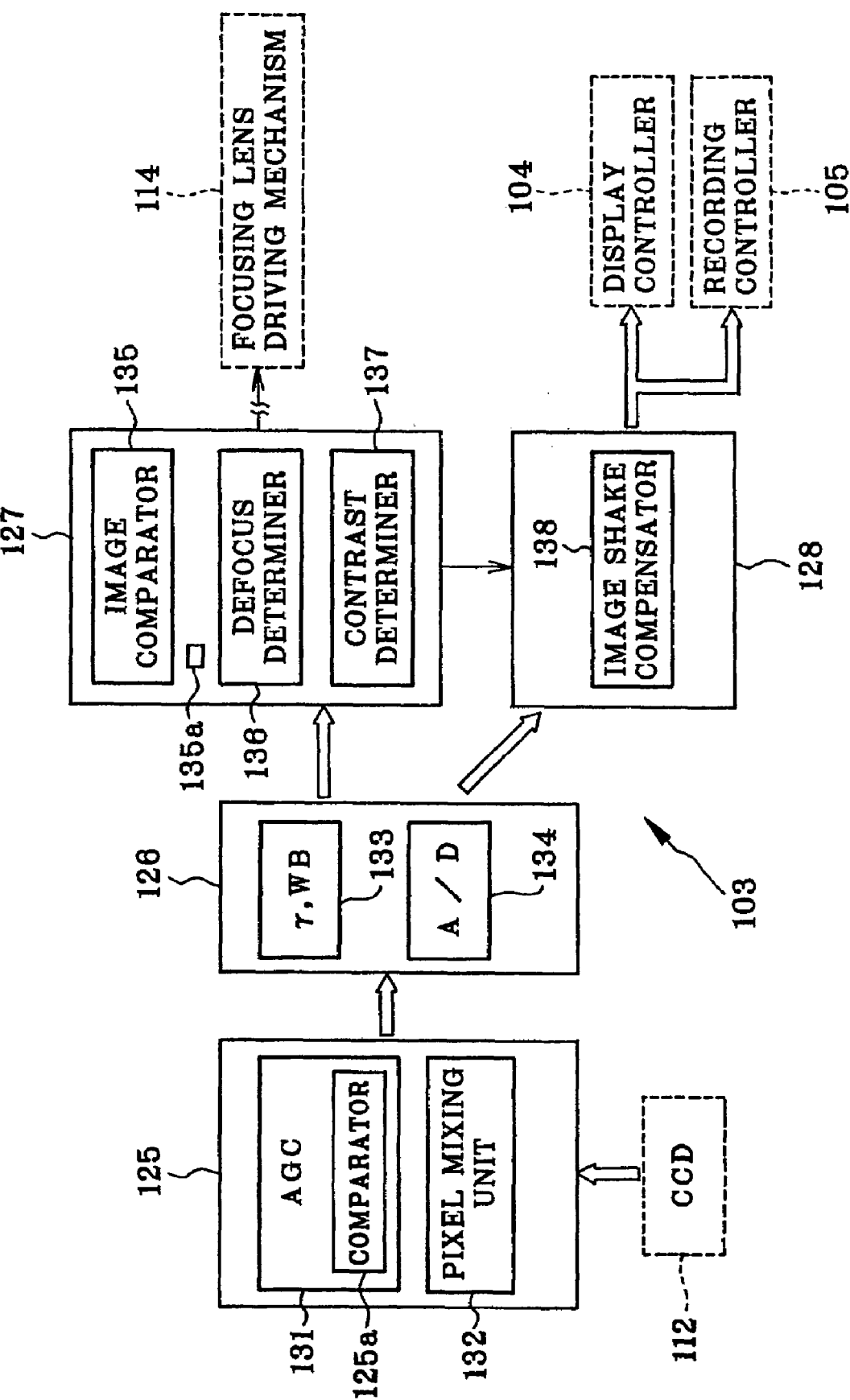
FIG. 11 is a block diagram schematically illustrating a pickup data processor in the autofocus camera.

In FIG. 11, a pickup data retrieving circuit 125 or brightness determiner includes an auto gain control (AGC) unit 131 and a pixel mixing unit 132 with an adder as gain controller. The AGC unit 131, in addition to the auto gain control, also operates to amplify the pickup data to ¼ as high as a reference level, and supplies the pixel mixing unit 132 with the data of the amplified level. The pixel mixing unit 132 adds up brightness signals of four pixels adjacent in a 2×2 matrix form, and substitutes the brightness of the sum for the initial brightness of the four pixels. According to the pickup data supplied to the pixel mixing unit 132, the contrast of the image becomes four times as high as the initial contrast, because the number of the pixels becomes ¼ as high as that at the time of pickup.

An image processing circuit 126 includes an image correction unit 133 and an A/D converter 134. The image correction unit 133 subjects the pickup data after the brightness correction to the adjustment of the white balance and the correction of the contrast gamma. The A/D converter 134 converts the corrected pickup data into a digital form of image data. The digital image data is sent to a focus evaluation circuit 127 and an image outputting circuit 128.

The focus evaluation circuit 127 includes an image comparator 135, a defocus determiner 136, and a contrast determiner 137. The image comparator 135 compares the reference pickup data with pickup data obtained by each operation of pickup per frames, and obtains an image deviation as a difference between those in consideration of pixels.

The defocus determiner 136 receives the image deviations from the image comparator 135, and obtains horizontal image deviations due to the shifts of the aperture stop opening, and converts the horizontal image deviations to deviations of the focus. Also, the defocus determiner 136 considers the deviations of the focus, and obtains a distance between the present position of the focusing lens 110 and an in-focus position, so as to calculate a moving amount of the focusing motor for the purpose of moving the focusing lens 110 to the in-focus position. The contrast determiner 137 analyzes the distribution of the contrast of an image according to the pickup data, to obtain a contrast evaluation result.

An image shake compensator 138 is incorporated in the image outputting circuit 128. The image shake compensator 138 is connected with the image comparator 135 for the purpose of image shake check, according to which a position of an image is corrected by compensating for a deviation of an object image in a horizontal direction upon shifting of the aperture stop opening 111 defined in an aperture stop unit, or compensating for a two-dimensional shake of a hand holding the camera. The image comparator 135 obtains image deviations between plural frames consecutive to one another in a time-sequential manner. To this end, a temporary memory 135a is used for storing pickup data of the plural images. In the image shake compensator 138, those image deviations are subjected to image shake check, so that the respective frames are subjected to the image shake compensation in the case of occurrence of image shake.

Figure 12:
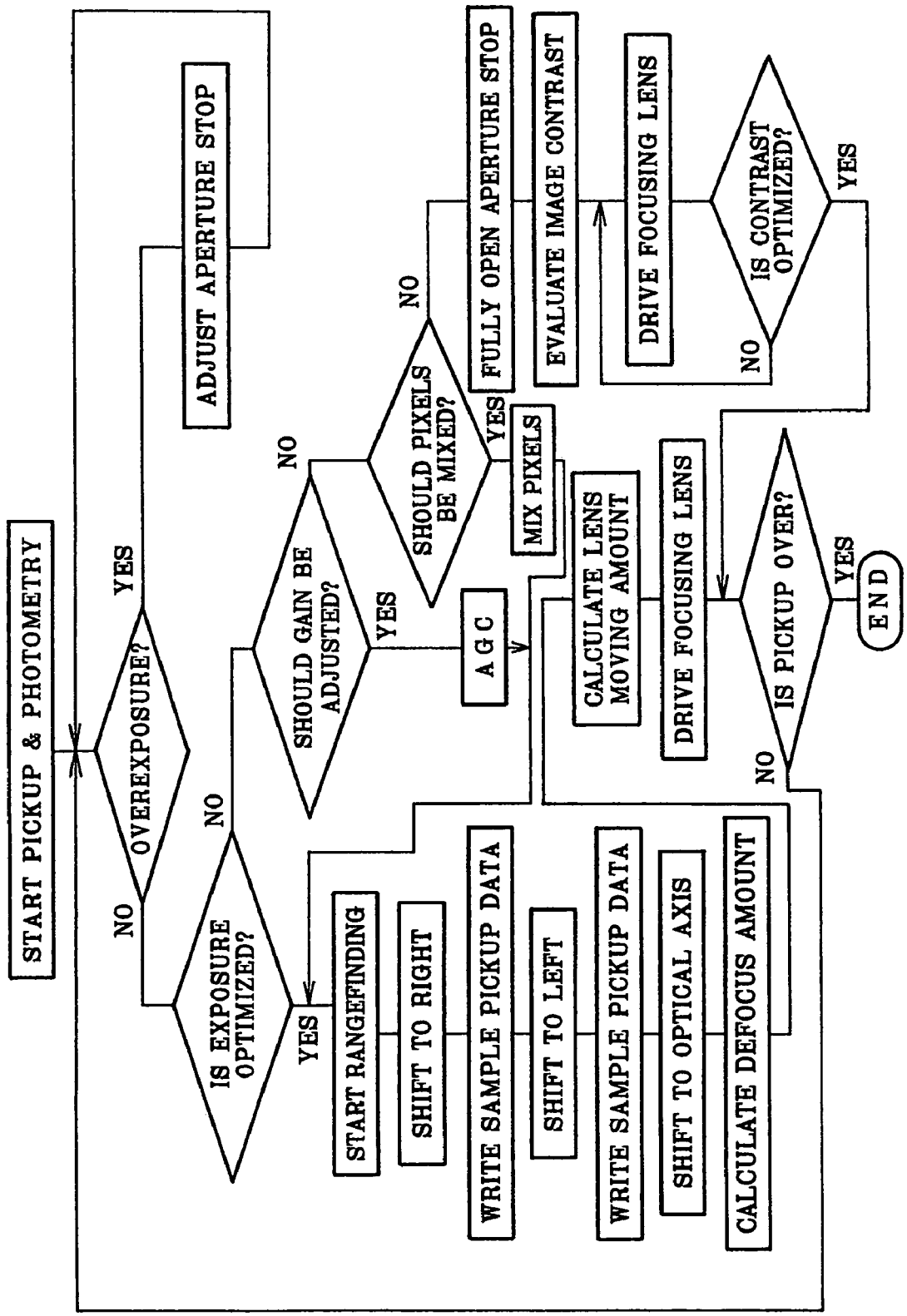
FIG. 12 is a flow chart illustrating a process of focus adjustment and pickup.

The operation of the present embodiment is described now by referring to FIG. 12. Pickup in the CCD pickup element 112 is started. An iris shifting circuit 115 in an aperture stop shifting mechanism is supplied by the main controller 102 with an exposure control signal, to drive the two aperture stop blades. The aperture stop opening 111 is set at a suitable diameter predetermined for the phase difference detection. A comparator 125a at the AGC unit 131 is utilized to evaluate object brightness by comparison with a threshold brightness. If the measured object brightness is suitable, then phase difference detection is started. If the object brightness is high in consideration of the threshold brightness, then the aperture stop opening 111 is driven and set at a smaller diameter. If the object brightness is low in consideration of the threshold brightness, then the aperture stop opening 111 does not change. An exposure is corrected in accordance with a designated state.

In the case of designating the brightness correction according to the gain adjustment, a brightness signal of the pickup data input by the AGC unit 131 is automatically amplified to the reference level. In the case of designating the brightness correction according to the pixel mixture, at first the AGC unit 131 automatically amplifies a brightness signal of the pickup data to ¼ as high a level as the reference level. Then the brightness signal is added up by the pixel mixing unit 132, and comes substantially near to the reference level. In the case of designating the exposure control according to the fully open aperture stop, the aperture stop opening 111 is set in a fully open state with a larger diameter than the diameter predetermined for the phase difference detection.

The focusing is started when the exposure is suitable or after effecting the brightness correction by the gain correction or pixel mixture. The main controller 102 sends a rangefinding starting signal to the iris shifting circuit 115, which drives iris motors to shift the aperture stop blades in an aperture stop shifting mechanism in one common direction. At first, the aperture stop opening 111 starts shifting to the right to reach the light amount gravity center P1 for the phase difference detection. The image comparator 135 obtains a deviation of the object image generated in the shift of the aperture stop opening 111, and sends information of the deviation to the image shake compensator 138. The image outputting circuit 128 supplies the display controller 104 and the recording controller 105 with the pickup data after the image shake compensation. When the aperture stop opening 111 becomes shifted to the light amount gravity center P1, then the main controller 102 sends a retrieval command signal to the image processing circuit 126. Pickup data is written to the focus evaluation circuit 127 as a first sample image for phase difference detection.

When the first retrieval of a sample image is ended, the main controller 102 sends a changeover signal to the iris shifting circuit 115. The iris shifting circuit 115 changes over driving of the iris motors, to start shifting the aperture stop opening 111 to the left. While the aperture stop opening 111 shifts, an image shake is compensated for in a similar manner to the shift to the right. When the aperture stop opening 111 comes to the light amount gravity center P2, the main controller 102 outputs a retrieval command signal, so a sample image is retrieved in the focus evaluation circuit 127. When the second retrieval of the sample image is ended, the aperture stop opening 111 is shifted back to the initial position defined about the optical axis A1.

The image comparator 135 compares the two sample images retrieved upon the shifts of the aperture stop opening 111 toward the right and left, and calculates a deviation of the images related to the position. The image comparator 135 sends information of the position deviation of the sample images to the defocus determiner 136. The defocus determiner 136 calculates a defocus amount or deviation of focus according to the position deviation of the sample images and the moving amount of the aperture stop opening 111. Also, the defocus determiner 136 obtains a distance required for moving the focusing lens 110 to an in-focus position by considering the defocus amount. The defocus determiner 136 supplies the main controller 102 with information of a focusing lens moving amount, to designate a direction and distance of moving the focusing lens 110.

The main controller 102 sends a focusing control signal to a circuit in the focusing lens driving mechanism 114 according to the information of the focusing lens moving amount. The circuit in the focusing lens driving mechanism 114 drives the focusing motor according to the moving direction and moving distance obtained by the defocus determiner 136. The focusing lens 110 is moved to the in-focus position along the optical axis. Object light is picked up on the CCD pickup element 112 in the in-focus state.

If the object brightness is a low brightness and if the fully open aperture stop is designated, then a command signal for the fully open aperture stop is sent by the main controller 102 to the iris shifting circuit 115. The aperture stop blades move to the fully open positions. The focusing lens 110 is moved in the optical axis direction. The contrast determiner 137 analyzes the distribution of the contrast of an image during adjustment of the focusing lens 110, and obtains a contrast evaluation result constituted by the finite difference between the minimum and maximum brightness levels of the pixels related to the measurement. The main controller 102 stops driving the focusing lens 110 in the position where the contrast evaluation result is maximized, to complete the focusing operation.

Figure 13:
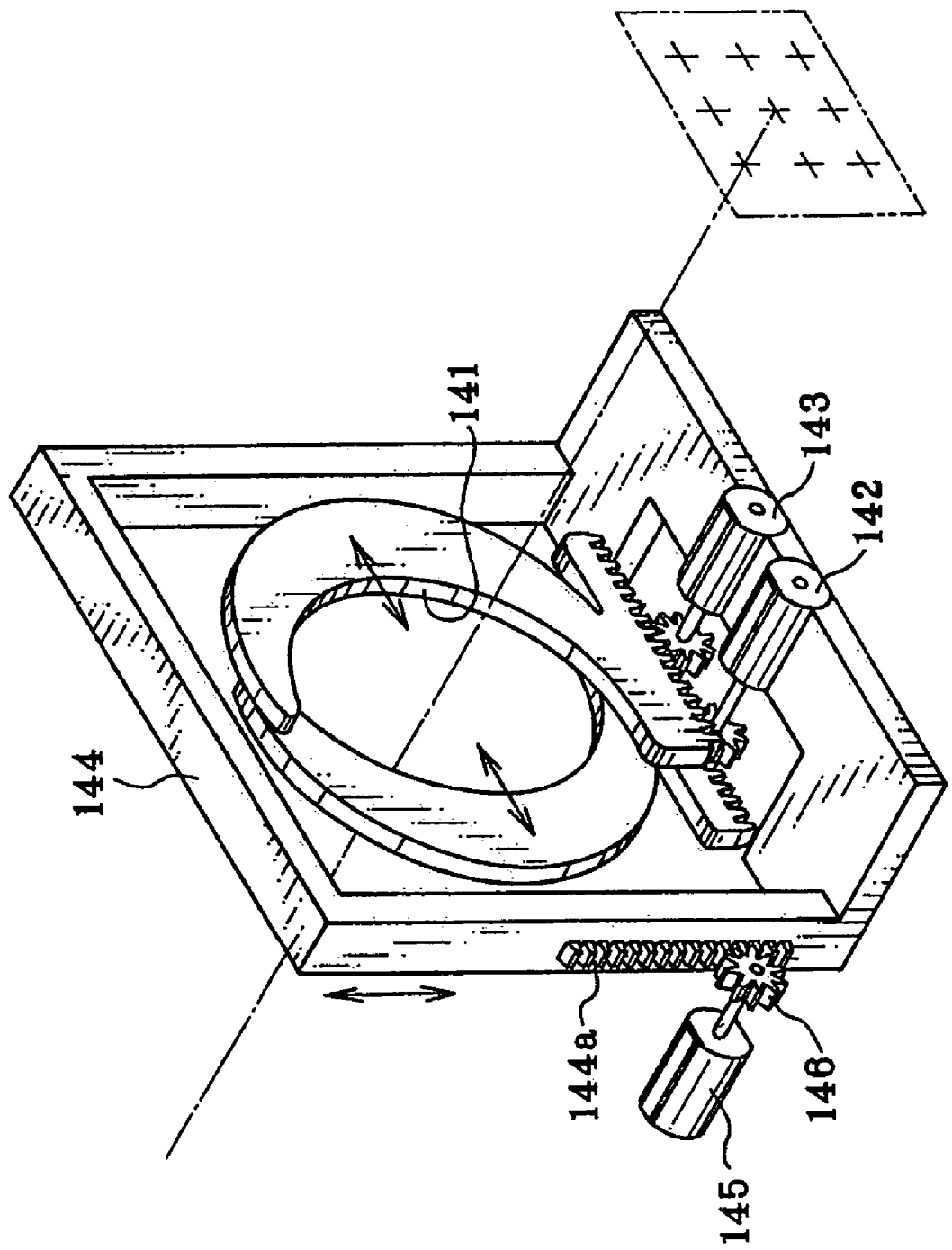
FIG. 13 is a perspective illustrating another preferred iris driving mechanism.

In FIG. 13, one preferred embodiment is illustrated, in which an aperture stop opening 141 defined in an aperture stop unit is shifted two-dimensionally. Iris motors 142 and 143 as blade actuators are supported on a holder frame 144. A rack portion 144a is formed with a lateral side of the holder frame 144. There is a motor 145, which has an output shaft with a gear 146 secured thereto. The rack portion 144a is meshed with the gear 146. To shift the aperture stop opening 141 vertically is separate from its horizontal shift. A focusing spot or center of the focusing can be determined in any desired position inside the pickup frame or pickup region.

Note that the pickup data processor 103 obtains an in-focus position by evaluating the deviation data between the first and second sample pickup data. To this end, a table memory can be preferably used. Deviation data can be previously obtained by conducting experiments. Data of in-focus positions may be written to the table memory at addresses of the deviation data.

In the above embodiment, the brightness is evaluated in three steps by evaluating the pickup data by use of high and low threshold brightness. For the comparison with the threshold brightness, the comparator 125*a* is incorporated in the pickup data retrieving circuit 125.

Specifically, at first the pickup data is evaluated by comparison with a high threshold brightness. If the brightness according to the pickup data is equal to or higher than the high threshold brightness, the first and second sample pickup data are created and considered for focus adjustment. If the brightness according to the pickup data is lower than the high threshold brightness, then the pickup data is evaluated by comparison with a low threshold brightness that is lower than the high threshold brightness. If the brightness according to the pickup data is equal to or higher than the low threshold brightness, then the first and second sample pickup data are created after amplification by the gain adjustment, and considered for focus adjustment. If the brightness according to the pickup data is lower than the low threshold brightness, then the fully open aperture stop is set. The gain adjustment is suppressed. The contrast is evaluated for the purpose of focus adjustment.

However, it is possible comprehensively to use the two methods of the gain adjustment and the sensitivity adjustment of the pixel mixture. In this case, a medium threshold brightness can be additionally used. As the high, medium, and low threshold brightness values are combined, the brightness according to the pickup data is evaluated in four steps.

To be precise, if the brightness according to the pickup data is lower than the high threshold brightness, then the pickup data is evaluated by comparison with a medium threshold brightness that is lower than the high threshold brightness. If the brightness according to the pickup data is equal to or higher than the medium threshold brightness, then the first and second sample pickup data are created after amplification by the gain adjustment, and considered for focus adjustment. If the brightness according to the pickup data is lower than the medium threshold brightness, then the pickup data is evaluated by comparison with a low threshold brightness that is lower than the medium threshold brightness. If the brightness according to the pickup data is equal to or higher than the low threshold brightness, then the first and second sample pickup data are created after amplification in the pixel mixture for the sensitivity adjustment, and considered for focus adjustment. If the brightness according to the pickup data is lower than the low threshold brightness, then the fully open aperture stop is set. The sensitivity adjustment in the pixel mixture is suppressed. The contrast is evaluated for the purpose of focus adjustment.

Furthermore, only one value of threshold brightness may be used. The brightness according to the pickup data can be evaluated only in two steps. Specifically, the pickup data is evaluated by comparison with a threshold brightness. If the brightness according to the pickup data is equal to or higher than the threshold brightness, then the first and second sample pickup data are created after amplification by the gain adjustment, and considered for focus adjustment. If the brightness according to the pickup data is lower than the threshold brightness, then the fully open aperture stop is set. The gain adjustment is suppressed. The contrast is evaluated for the purpose of focus adjustment.

Another preferred digital still camera is described with reference to FIGS. 14–17, in which a moving object can be focused easily with a simple structure. Elements similar to those of the above embodiments are designated with identical reference numerals.

Figure 14:
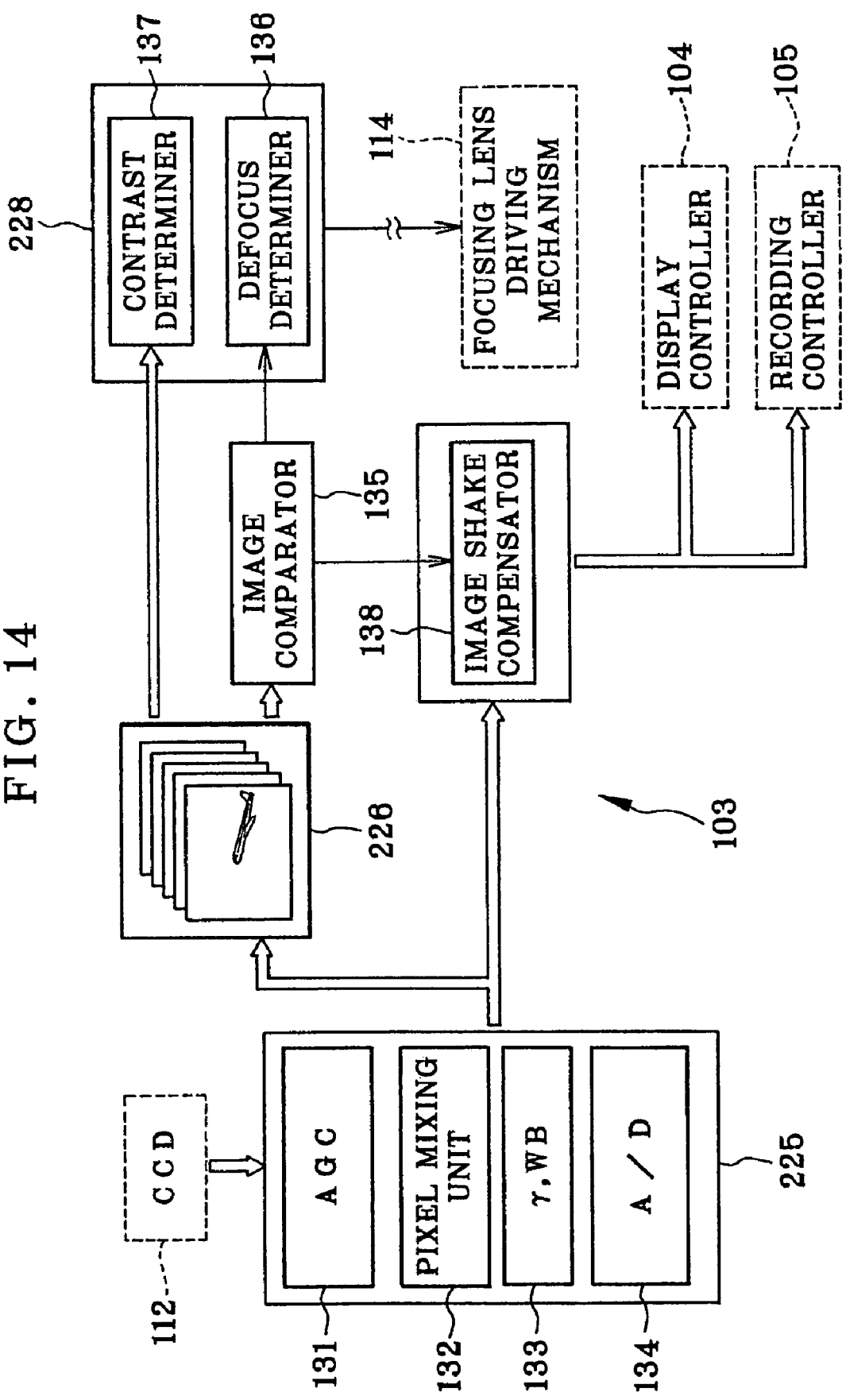
FIG. 14 is a block diagram schematically illustrating another preferred autofocus camera suitable for a moving object.

In FIG. 14, a pickup data retrieving circuit 225 outputs pickup data. A frame memory 226 stores the pickup data from the pickup data retrieving circuit 225 for the purpose of comparing images. Plural frames can be stored in the frame memory 226. When the number of the frames to be written to the frame memory 226 becomes over the maximum number of writeable frames of the frame memory 226, then the stored frames are overwritten according the time sequence of writing. To be precise, one newest frame is written at the same time as the oldest one of all the stored frames is deleted. The image comparator 135 reads images of two frames from the frame memory 226, and obtains a deviation between the images per pixels. The image comparator 135, obtaining the deviation of the images of the two frames, operates for outputting data for detection of image shake derived from shift of the aperture stop opening 111 or manual camera shake of a user's hand, and operates for outputting data for measuring a focus deviation by obtaining a deviation between sample images according to setting of the aperture stop opening 111 in the two light amount gravity centers.

A focus evaluation circuit 228 is constituted by the contrast determiner 137 and the defocus determiner 136. The contrast determiner 137 reads frame data of the frames from the frame memory 226 sequentially, analyzes changes in the contrast by comparison between the frames, and outputs a contrast detection signal of which a value is either one of a contrast being set higher and a contrast being set lower. The contrast detection signal is sent to the main controller 102, which drives and adjusts the focusing lens 110 to set the contrast high.

The defocus determiner 136 obtains a defocus amount or deviation of focus according to the focus deviation measuring data output by the image comparator 135, and calculates a moving amount for the focusing lens 110. The focus deviation measuring data is constituted by first image deviation information derived from horizontal shifting of the aperture stop opening 111, and second image deviation information derived from movement of an object to be picked up. The defocus determiner 136 considers a finite difference between the first image deviation information and the second image deviation information, and obtains image deviation information relevant to disparity of view of the aperture stop opening 111. The disparity information of view is converted to a defocus amount, to obtain a driving amount of the focusing lens 110.

Figure 15:
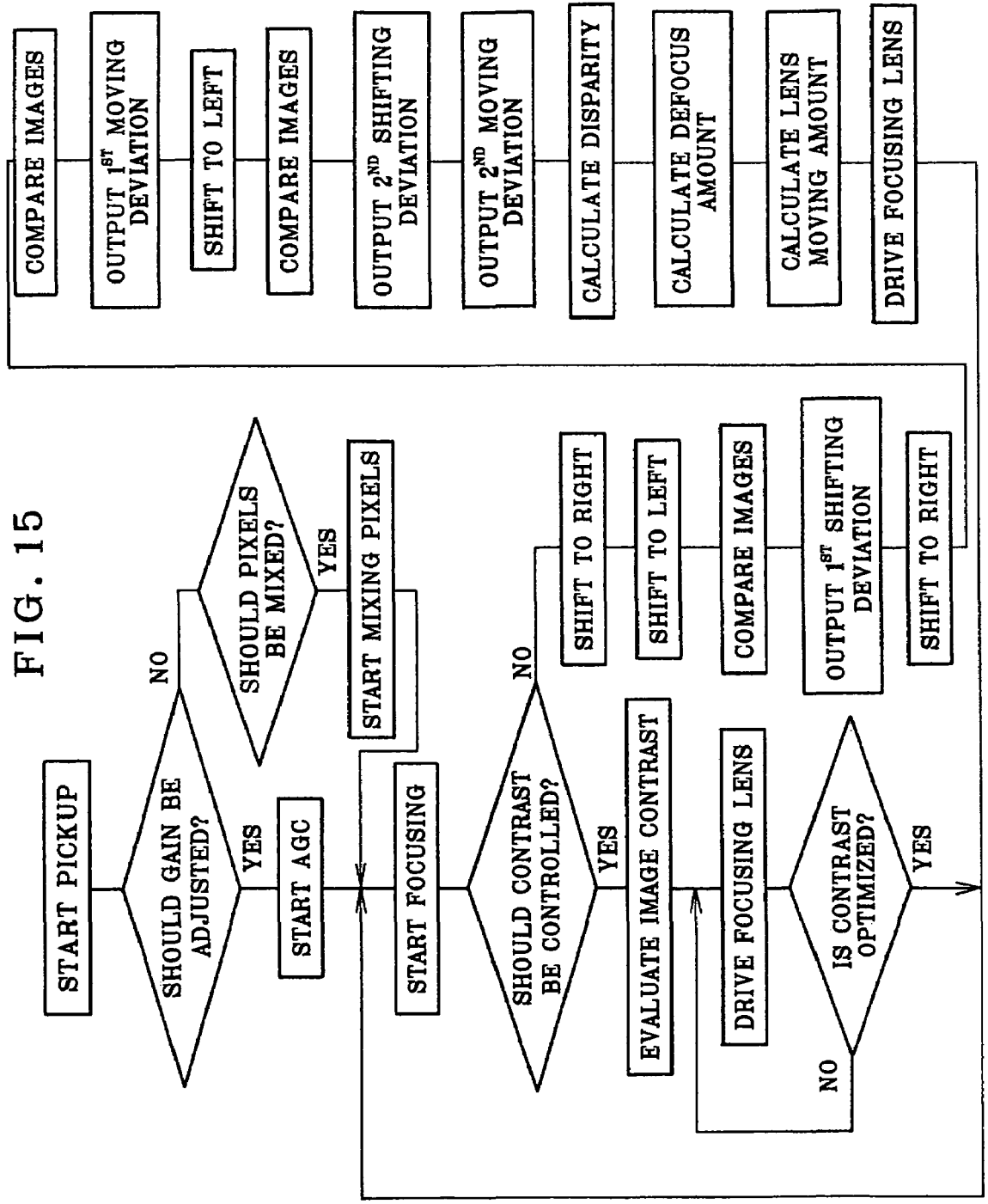
FIG. 15 is a flow chart illustrating a process of focus adjustment and pickup.

The operation of the present embodiment is described now with reference to FIG. 15. The main controller 102 executes a sequence of one of the focus control according to the contrast measurement and the focus control according to the phase difference detection. If the focus control of the contrast measurement is designated and executed, the focusing lens driving mechanism 114 moves the focusing lens 110 finely at a very small amount. The contrast determiner 137 compares images read from the frame memory 226, and responsively obtains changes in the contrast due to the fine movement of the focusing lens 110.

In the case of the focus control according to the phase difference detection, the iris shifting circuit 115 drives the iris motors to shift the aperture stop blades in one common direction. The aperture stop opening 111 starts shifting to the right, and reaches the light amount gravity center P1 for the phase difference detection. The image comparator 135 obtains a deviation of the object light generated during the shift of the aperture stop opening 111, and sends the data for the image shake detection to the image shake compensator 138. The image shake compensator 138 corrects the position of the images according to the image shake detection data. The image data after the image shake compensation is output to the display controller 104 and the recording controller 105. If it is detected that an contour of the photographic object is unsharp and out of focus, then the aperture stop opening 111 is driven to reduce the diameter of the aperture stop.

When the center of the aperture stop opening 111 reaches the light amount gravity center P1, the iris shifting circuit 115 drives the iris motors in the reverse direction, to start shift to the left. While the aperture stop opening 111 is moved, an image shake is compensated for in the same manner as the shift to the right. When the center of the aperture stop opening 111 reaches the light amount gravity center P2, the aperture stop opening 111 starts being shifted to the right for a second time. Upon completion of the first shifts to the right and then to the left, the image comparator 135 compares images having been picked up in setting the aperture stop opening 111 in the two light amount gravity centers for the phase difference detection. The image comparator 135 obtains a first shifting deviation of images according to the first shift of the aperture stop opening 111, and outputs the first shifting deviation to the defocus determiner 136.

When the aperture stop opening 111 reaches the light amount gravity center P1 again, the aperture stop opening 111 starts a second shift toward the left. The image comparator 135 compares images picked up each time of setting the aperture stop opening 111 in the light amount gravity center P1, and obtains a first moving deviation of images generated by movement of an object during back-and-forth movement of the aperture stop opening 111. The image comparator 135 sends the obtained first moving deviation to the defocus determiner 136.

When the aperture stop opening 111 reaches the light amount gravity center P2 again, the aperture stop opening 111 comes back to the optical axis in the initial state. The image comparator 135 obtains a second shifting deviation of images according to the second shift of the aperture stop opening 111, and outputs the second shifting deviation to the defocus determiner 136. Also, the image comparator 135 compares images picked up each time of setting the aperture stop opening 111 in the light amount gravity center P2, and obtains a second moving deviation of images generated by movement of an object during back-and-forth movement of the aperture stop opening 111. The image comparator 135 sends the obtained second moving deviation to the defocus determiner 136.

Figure 16:
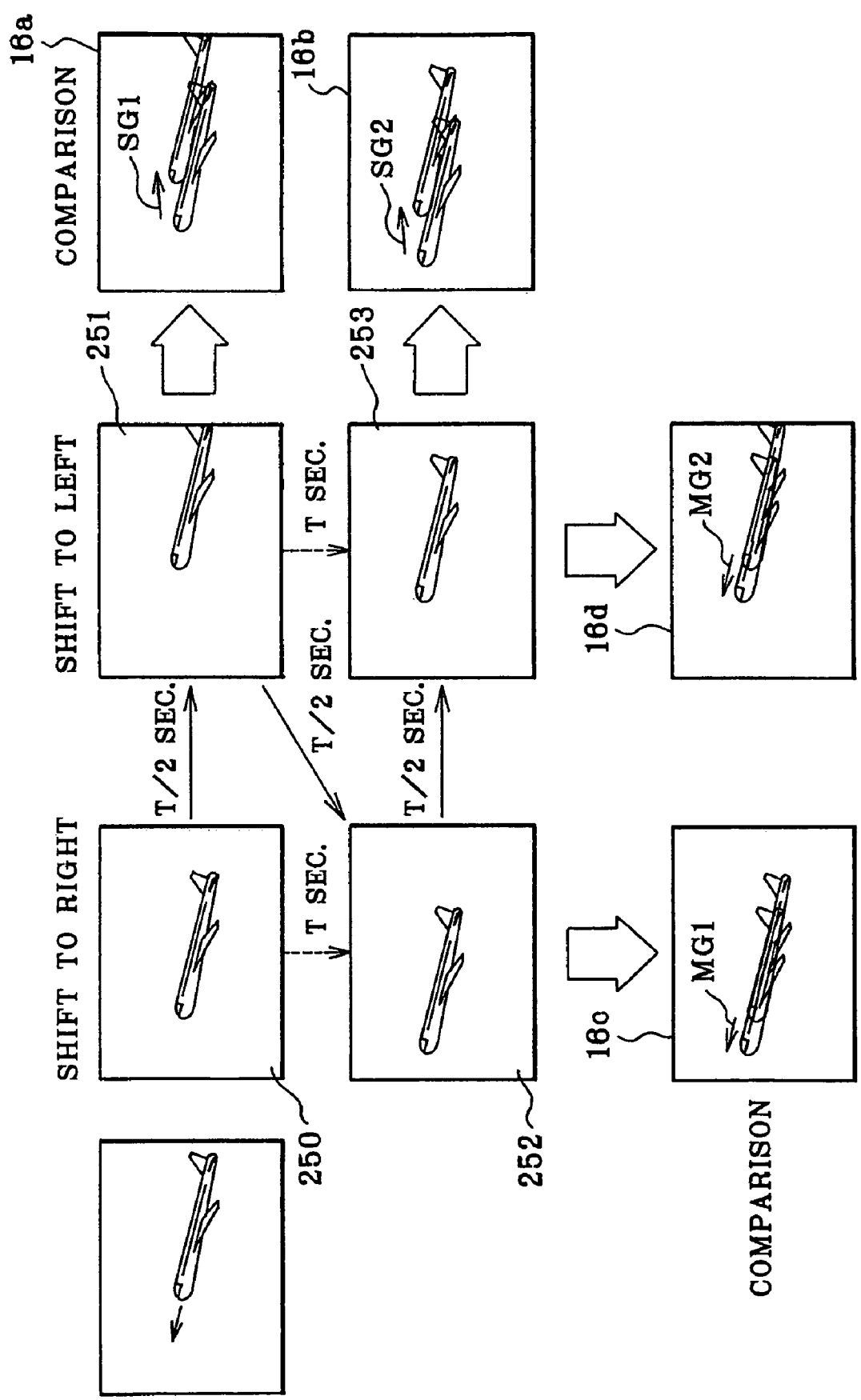
FIG. 16 is a explanatory view illustrating a series of sample pickup images for the purpose of focusing.
Figure 17:
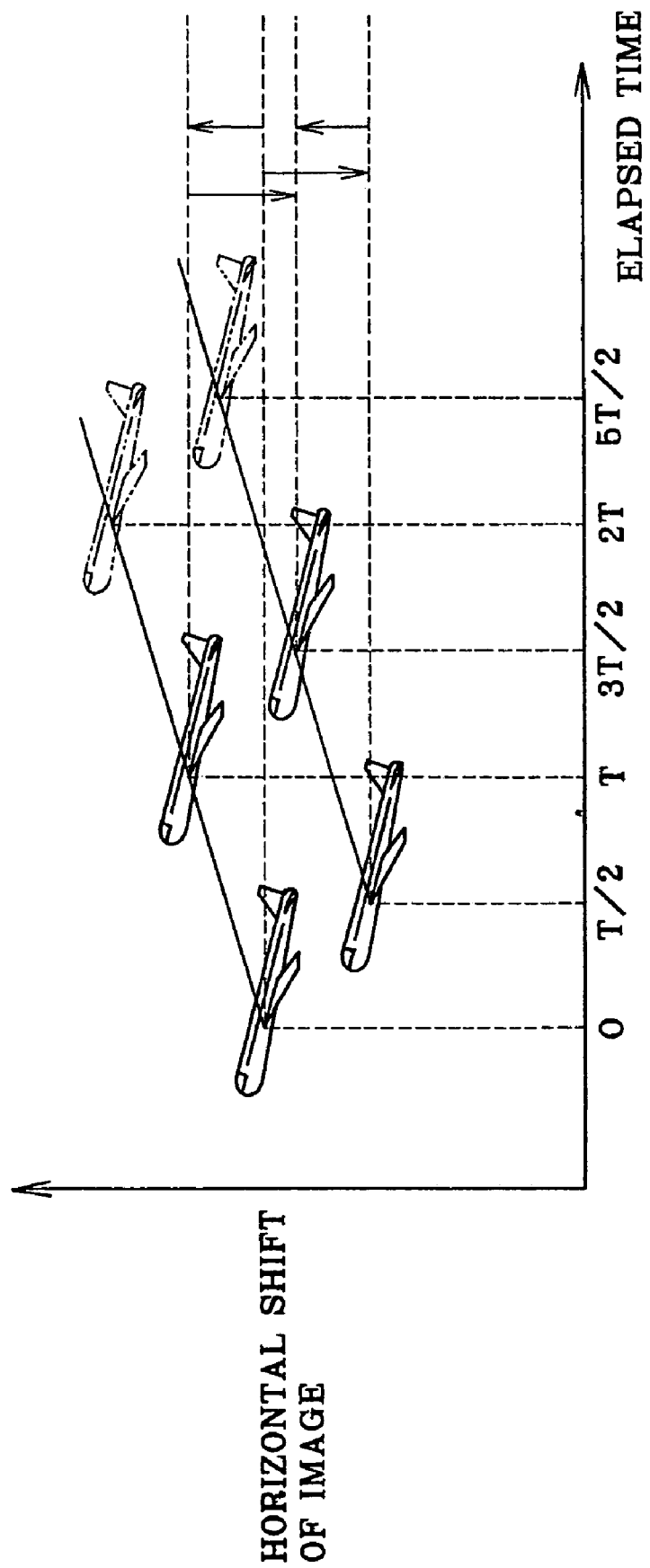
FIG. 17 is a graph illustrating positions of the moving object picked up with reference to elapsed time.

Let a photographic object travel at a constant speed and straight from a right-side lower corner toward a left-side upper corner of a frame. In FIGS. 16 and 17, an image 250 is picked up when the aperture stop opening 111 is shifted toward the right. An image 251 is picked up when the aperture stop opening 111 is shifted toward the left. An image 252 is picked up when the aperture stop opening 111 is shifted toward the right for a second time. An image 253 is picked up when the aperture stop opening 111 is shifted toward the left for a second time. Let T seconds be a period of the back-and-forth shift of the aperture stop opening 111. The images 250–253 are picked up at a period of T/2 seconds. A first shifting deviation SG1 is obtained at 16a by comparison between the images 250 and 251. A second shifting deviation SG2 is obtained at 16b by comparison between the images 252 and 253. Also, a first moving deviation MG1 is obtained at 16c by comparison between the images 250 and 252. A second moving deviation MG2 is obtained at 16d by comparison between the images 251 and 253.

Each of the two moving deviations MG1 and MG2 constitutes a difference of the images caused by movement of the photographic object within T seconds. Each of the two shifting deviations SG1 and SG2 constitutes a difference of the images caused by movement of the photographic object within T/2 seconds. Therefore, it is possible to find disparity of view generated by the horizontal shifting of the aperture stop opening 111 as the moving deviation per T/2 seconds is calculated, and the unit moving deviation is subtracted from the shifting deviation. According to the present embodiment, the two moving deviations MG1 and MG2 are the same in the direction and the size. As a result, straight movement of the photographic object at the constant speed in parallel with the pickup surface is found on the basis of analyzing the moving deviations. A half of the first moving deviation MG1 can be subtracted from the first shifting deviation SG1, to obtain the disparity of view.

The defocus determiner 136 calculates the defocus amount or deviation of focus according to the obtained disparity of view. Succeeding processes after this are the same as those of the above embodiment.

Furthermore, a defocus amount can be obtained by extracting the disparity of view due to the movement of the aperture stop opening 111, because fine periodical shifts of images due to a camera shake with hands, irregular shifts of images due to panning or the like can be eliminated from the images obtained each time of setting the aperture stop opening 111 in the light amount gravity centers. If an object travels straight at a constant speed, the shift of the images can be separated because the aperture stop opening 111 can be shifted back and forth for two times. However, the time of the back-and-forth shifts of the aperture stop opening 111 can be determined greater, to predict fine periodical shifts or irregular shifts of images, so as to eliminate influence of such shifts from the focusing.

Note that, in the case of considering movement of a photographic object in the optical axis direction, it is possible to effect the phase difference detection repeatedly for continuous autofocus control. Also, changes in the in-focus position can be sampled in a time-sequential manner, for the purpose of the moving body predicting autofocus control in consideration of time lag due to driving of the focusing lens. If the object distance changes during shifts of the aperture stop opening, no error will occur in detecting an image deviation in the case of sufficiently small changes in a magnification of the object image on a pickup surface. However, it is possible to detect a portion of an object image in the vicinity of the center of the pickup surface. This is effective in reducing a change in the magnification of the object image, so that a width of changing the object distance capable of detecting an image deviation can be enlarged.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An autofocus camera comprising:

a taking lens system, including a focusing lens movable on a lens optical axis, for being set in an in-focus position according to an object distance, to condense object light from a photographic object on a focal plane;

a lens driving mechanism for moving said focusing lens on said lens optical axis;

a pickup element, disposed on said focal plane, for outputting pickup data by picking up said object;

an aperture stop unit for limiting a light amount of said object light;

an aperture stop shifting mechanism for moving said aperture stop unit alternately in a first direction and a second direction reverse thereto on a plane perpendicular to said lens optical axis, to set said aperture stop unit cyclically between first and second light amount gravity centers, wherein said first and second light amount gravity centers are equidistant from said lens optical axis, and wherein said pickup element outputs first and second sample pickup data by picking up said object through said aperture stop unit when said aperture stop unit is set at respectively said first and second light amount gravity centers;

a first determiner for determining first image deviation information by comparison between said first and second sample pickup data;

a second determiner for determining second image deviation information by comparison between a preceding output of said first sample pickup data and a present output of said first sample pickup data; and a controller for checking focusing of said focusing lens according to said first and second image deviation information, and for actuating said lens driving mechanism to set said focusing lens in said in-focus positions, wherein said aperture stop shifting mechanism has actuators for moving said aperture stop unit and said actuators change an opening size of said aperture stop unit by setting said aperture stop unit on said lens optical axis, to adjust said light amount for an exposure.

2. An autofocus camera as defined in claim 1, wherein said controller determines disparity of view generated by movement of said aperture stop unit according to said first and second image deviation information, and said disparity of view corresponds to a defocus amount of said focusing lens from said in-focus position.

* * * * *